United States Patent [19]

Eichelberger et al.

[11] 4,213,182

[45] Jul. 15, 1980

[54] PROGRAMMABLE ENERGY LOAD CONTROLLER SYSTEM AND METHODS

[75] Inventors: Charles W. Eichelberger; Edward B. Miller, both of Schenectady; N.Y.

[73] Assignee: General Electric Company, Schenectady, N.Y.

[21] Appl. No.: 966,816

[22] Filed: Dec. 6, 1978

Related U.S. Application Data

[63] Continuation of Ser. No. 871,989, Jan. 24, 1978, abandoned.

[51] Int. Cl.² ............... G01R 21/00; G06F 15/06
[52] U.S. Cl. ................. 364/493; 179/2 AM; 315/312; 324/103 R; 364/120; 364/900
[58] Field of Search ............... 364/492–494, 364/119, 120, 200, 900, 483; 340/150, 151, 309.1; 324/103 R, 103 P; 179/2 AM; 361/78–82, 84; 315/294, 312–318; 307/38

[56] References Cited

U.S. PATENT DOCUMENTS

| | | | |
|---|---|---|---|
| 2,177,843 | 10/1939 | Seeley | 171/97 |
| 2,994,804 | 8/1961 | Skirpan | 315/319 |
| 3,004,193 | 10/1961 | Bentham et al. | 315/295 |
| 3,205,368 | 9/1965 | Miracle | 307/38 |
| 3,221,214 | 11/1965 | Wolff et al. | 315/295 |
| 3,246,304 | 4/1966 | Brown, Jr. et al. | 364/900 |
| 3,323,013 | 5/1967 | Lord | 315/187 |
| 3,348,440 | 10/1967 | Jensen | 83/58 |
| 3,359,551 | 12/1967 | Dennison | 340/310 |
| 3,384,713 | 5/1968 | Duncan | 179/2 |
| 3,400,374 | 9/1968 | Schumann | 364/900 |
| 3,403,381 | 9/1968 | Haner | 340/171 R |
| 3,403,382 | 9/1968 | Frielinghaus et al. | 364/900 |
| 3,414,878 | 12/1968 | Smith | 340/41 |
| 3,430,222 | 2/1969 | Gratrix, Sr. et al. | 340/286 R |
| 3,444,521 | 5/1969 | Breese | 340/163 |
| 3,445,814 | 5/1969 | Spalti | 340/151 |
| 3,448,338 | 6/1969 | Bentham et al. | 315/295 |
| 3,467,835 | 9/1969 | De Cola | 307/125 |
| 3,483,424 | 12/1969 | Woodnutt | 315/177 |
| 3,491,263 | 1/1970 | Isaacs | 315/293 |
| 3,508,113 | 4/1970 | Isaacs | 315/292 |
| 3,508,114 | 4/1970 | Johansson et al. | 315/292 |
| 3,510,845 | 5/1970 | Couleur et al. | 364/900 |
| 3,513,443 | 5/1970 | Andersen | 340/164 |
| 3,514,670 | 5/1970 | Isaacs | 315/292 |
| 3,551,885 | 12/1970 | Henzel | 340/146.1 |
| 3,555,251 | 1/1971 | Shavit | 364/900 |
| 3,558,902 | 1/1971 | Casey | 340/310 |
| 3,579,030 | 5/1971 | Bentham et al. | 315/291 |
| 3,582,896 | 6/1971 | Silber | 364/900 |
| 3,590,271 | 6/1971 | Peters | 307/140 |
| 3,603,961 | 9/1971 | Duris et al. | 340/166 |
| 3,614,738 | 10/1971 | Slavin | 340/163 |
| 3,622,992 | 11/1971 | Schoenwitz | 340/163 |
| 3,622,994 | 11/1971 | Schoenwitz | 340/152 |
| 3,626,370 | 12/1971 | Stubbs | 340/163 |
| 3,633,166 | 1/1972 | Picard | 340/163 |
| 3,644,891 | 2/1972 | McCrea | 340/163 |
| 3,668,467 | 6/1972 | Isaac | 315/292 |
| 3,668,653 | 6/1972 | Fair et al. | 364/900 |
| 3,684,358 | 8/1972 | Boudouris et al. | 340/309.1 |
| 3,684,858 | 8/1972 | Buck | 219/216 |
| 3,686,632 | 8/1972 | Olcelli et al. | 340/163 R |
| 3,689,886 | 9/1972 | Durkee | 340/163 |
| 3,689,887 | 9/1972 | La Falce et al. | 340/163 |
| 3,697,821 | 10/1972 | Johnson | 315/194 |
| 3,702,460 | 11/1972 | Blose | 340/150 |
| 3,706,914 | 12/1972 | Van Buren | 315/316 |
| 3,714,453 | 1/1973 | Delisle et al. | 307/39 |
| 3,716,096 | 2/1973 | Berrett et al. | 340/163 |
| 3,723,753 | 3/1973 | Davis | 307/41 |
| 3,729,581 | 4/1973 | Andersen | 340/171 |
| 3,763,394 | 10/1973 | Blanchard | 315/294 |
| 3,766,431 | 10/1973 | Isaacs | 315/292 |
| 3,774,056 | 11/1973 | Sample et al. | 340/309.1 |
| 3,784,874 | 1/1974 | Barrett et al. | 315/294 |
| 3,784,875 | 1/1974 | Baker et al. | 315/294 |
| 3,787,728 | 1/1974 | Bayer et al. | 307/41 |
| 3,790,848 | 2/1974 | Lai | 315/155 |
| 3,796,995 | 3/1974 | Strojny | 340/163 |
| 3,803,491 | 4/1974 | Osborn | 325/53 |
| 3,819,932 | 6/1974 | Aver, Jr. et al. | 340/163 |
| 3,820,078 | 6/1974 | Curley et al. | 364/900 |
| 3,831,059 | 8/1974 | Lo Nigro | 315/360 |
| 3,832,688 | 8/1974 | Strojny et al. | 340/163 |
| 3,842,249 | 10/1974 | Geyer et al. | 340/163 |
| 3,845,376 | 10/1974 | Brushwyler et al. | 340/147 R |
| 3,845,467 | 10/1974 | Oman et al. | 340/163 |
| 3,845,472 | 10/1974 | Buchanan et al. | 340/163 |
| 3,854,122 | 12/1974 | Cross | 340/151 |
| 3,882,465 | 5/1975 | Cook et al. | 340/163 |
| 3,903,515 | 9/1975 | Haydon et al. | 340/309.1 |
| 3,906,242 | 9/1975 | Stevenson | 307/38 |

| | | | |
|---|---|---|---|
| 3,911,415 | 10/1975 | Whyte | 340/310 A |
| 3,925,680 | 12/1975 | Dixon | 307/39 |
| 3,925,704 | 12/1975 | Camic | 315/200 A |
| 3,937,978 | 2/1976 | Owenby, Jr. | 307/41 |
| 3,940,660 | 2/1976 | Edwards | 315/360 |
| 3,942,170 | 3/1976 | Whyte | 340/310 A |
| 3,964,023 | 6/1976 | Fauchez | 340/310 A |
| 3,965,335 | 6/1976 | Ricci et al. | 340/150 |
| 3,965,336 | 6/1976 | Grohmann | 235/92 FQ |
| 3,966,047 | 6/1976 | Antonaccio | 340/310 R |
| 3,971,010 | 7/1976 | Foehn | 340/310 A |
| 3,971,028 | 7/1976 | Funk | 340/310 A |
| 3,987,430 | 10/1976 | Saarem et al. | 340/309.1 |
| 4,001,557 | 1/1977 | Stephenson | 236/15 R |
| 4,007,458 | 2/1977 | Hollabaugh | 340/310 R |
| 4,008,458 | 2/1977 | Wensley | 340/151 |
| 4,012,734 | 3/1977 | Jagoda et al. | 340/310 A |
| 4,017,845 | 4/1977 | Kilian et al. | 340/310 R |
| 4,021,615 | 5/1977 | James et al. | 179/2 A |
| 4,027,301 | 5/1977 | Mayer | 340/150 |
| 4,031,470 | 6/1977 | Kokado et al. | 340/309.1 |
| 4,048,620 | 9/1977 | Crandall et al. | 340/151 |
| 4,153,936 | 5/1979 | Schmitz et al. | 364/493 |

OTHER PUBLICATIONS

McGowan et al., "A New Approach to Lighting System Control", Journal of I.E.S., Oct. 1976, pp. 38–43.
Discussion of McGowan et al., Article; J.I.E.S., Jan. 1977, pp. 125, 126.

*Primary Examiner*—Errol A. Krass
*Attorney, Agent, or Firm*—Geoffrey H. Krauss; James C. Davis; Marvin Snyder

[57] ABSTRACT

A programmable energy load controller system, allowing each of a multiplicity of energy loads to be established in a selected one of an unenergized condition and a plurality of energized conditions, utilizes a central microcomputer facility in communication with a selected one of a plurality of remotely located load control processors, each configured with a unique address and capable of selectively energizing a plurality of energy loads coupled thereto under control of the central facility. The central facility includes at least one user input device, allowing a plurality of maps of load conditions, established in accordance with a user-selectable criteria, such as time-of-day and day-of-week requirements, to be loaded into a data storage associated with the central computer. A real time clock means are utilized in association with the computer and the memory to enable the desired map of load energization under the selected criteria, with means being provided for entering, on a high priority basis, overrides to at least a selected portion of the map currently implemented. Programmable energy load control methods are also disclosed.

43 Claims, 31 Drawing Figures

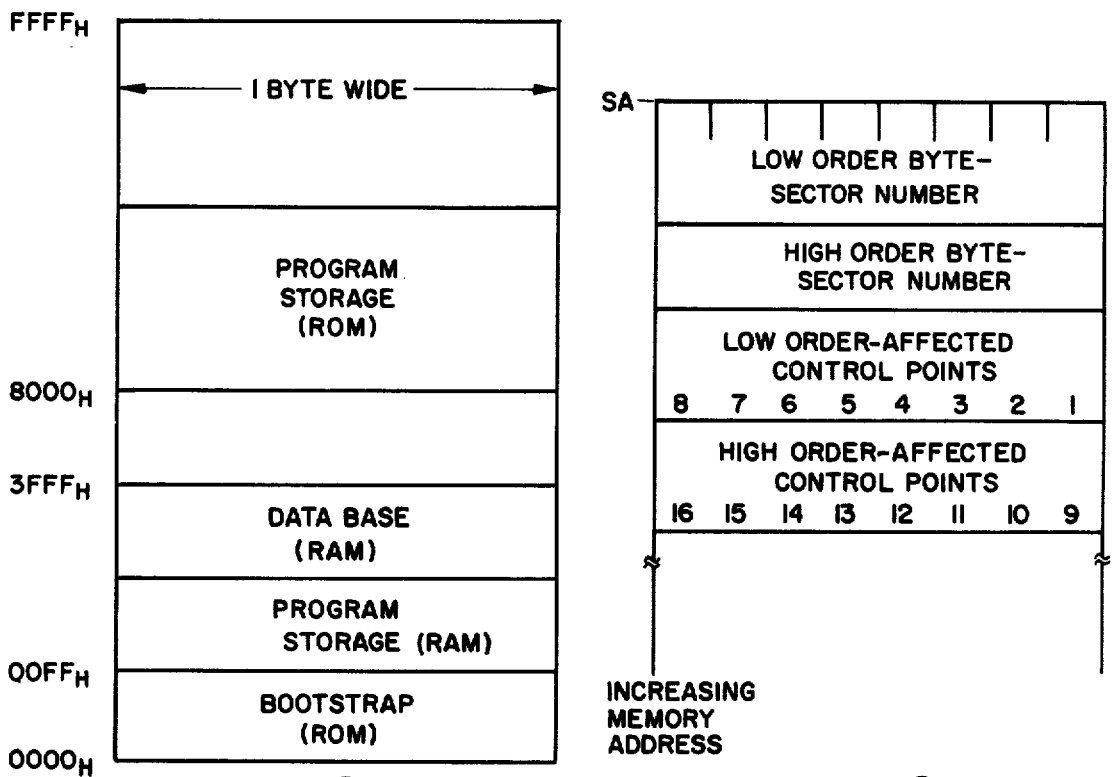
Fig. 3
Fig. 5
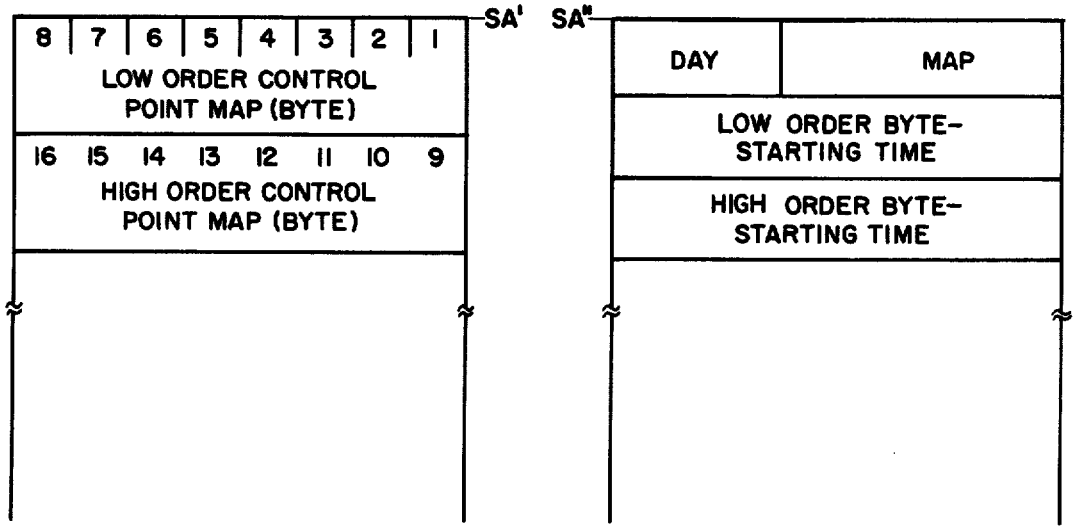
Fig. 7
Fig. 9

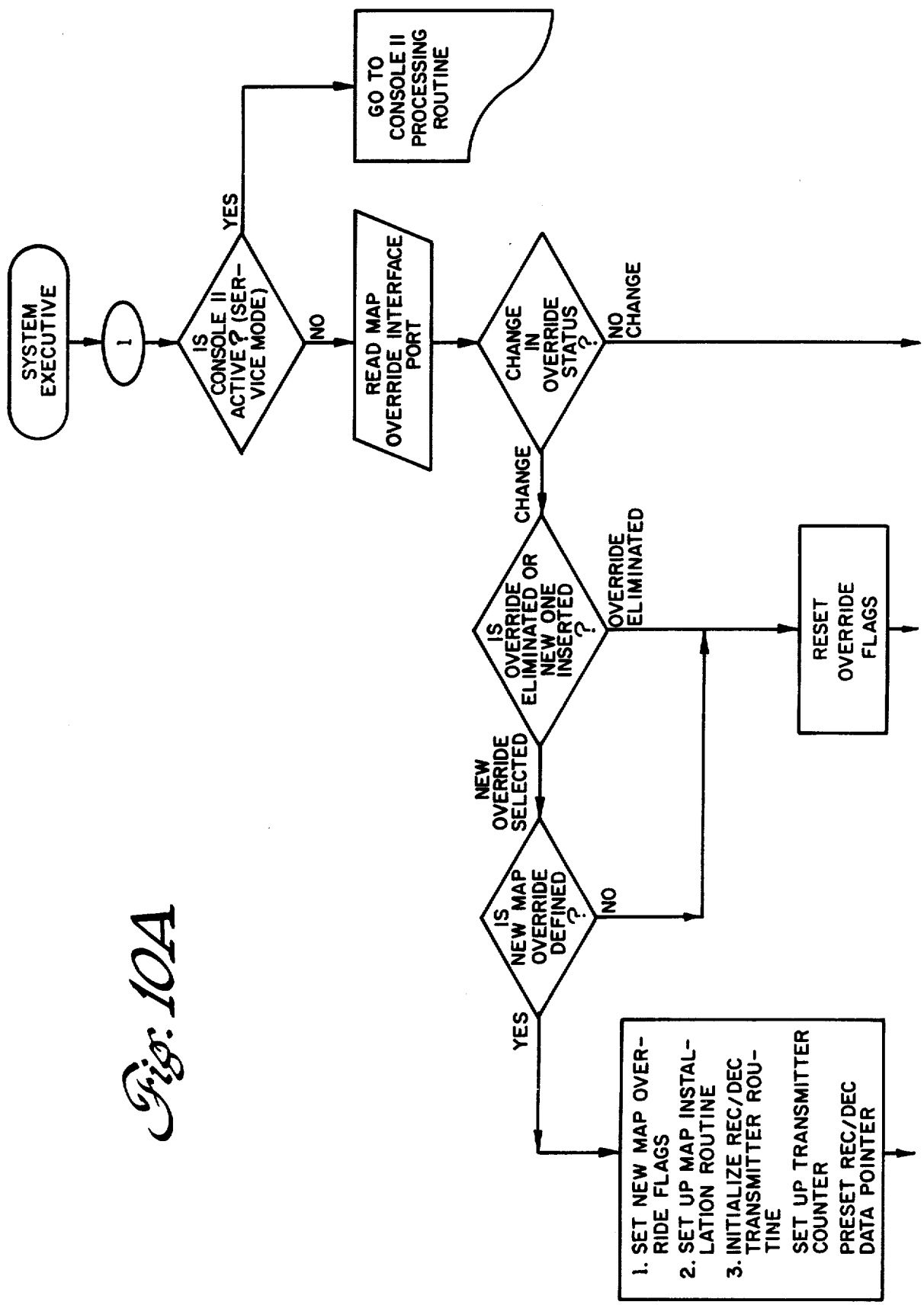

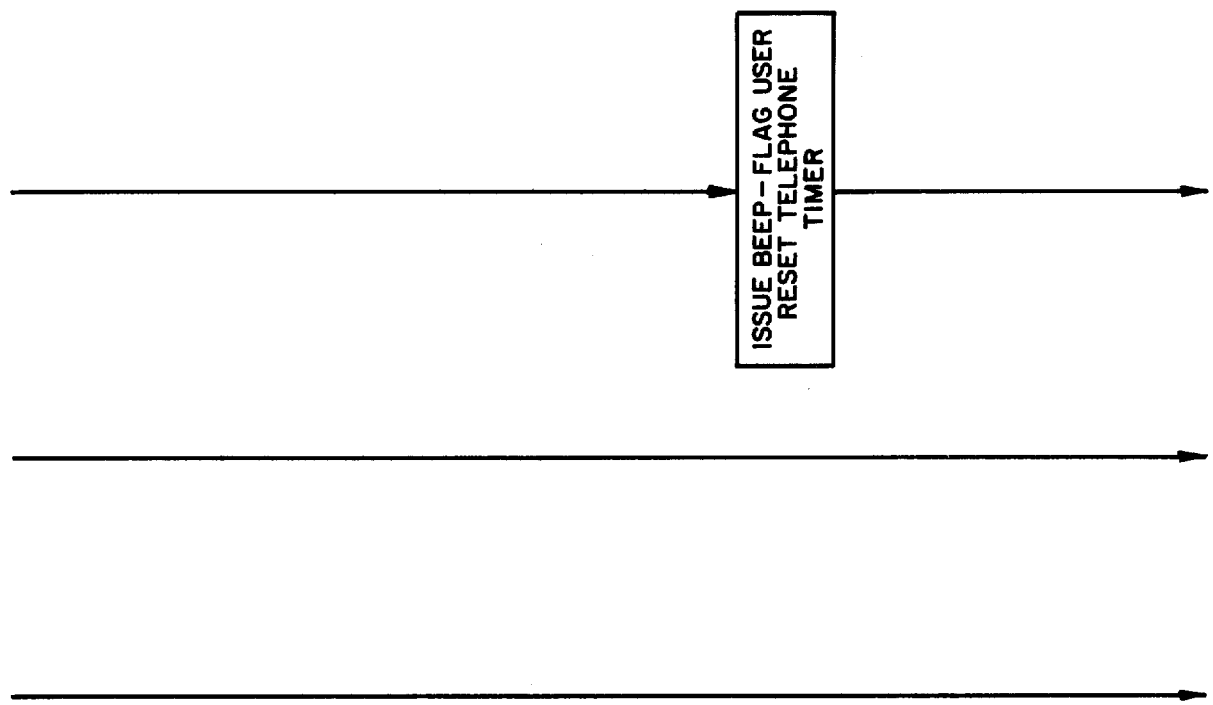
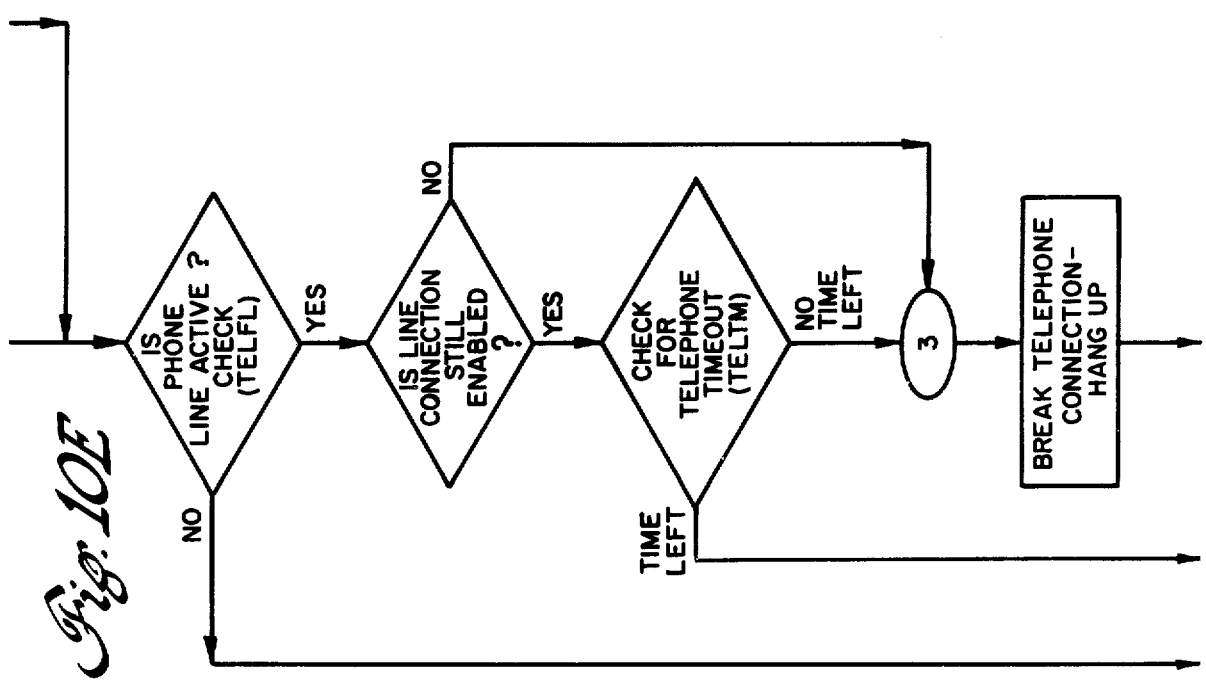
Fig. 10E

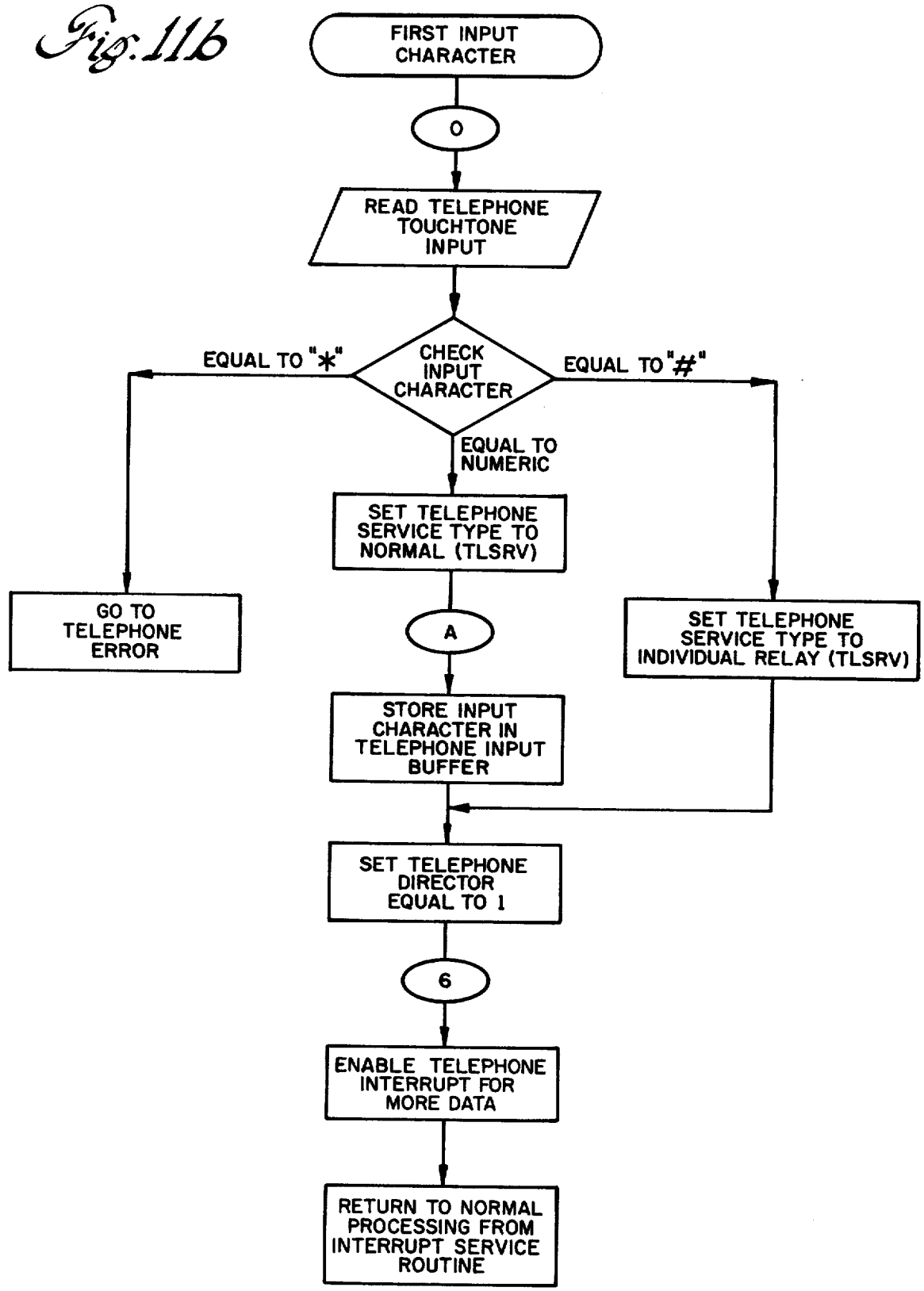

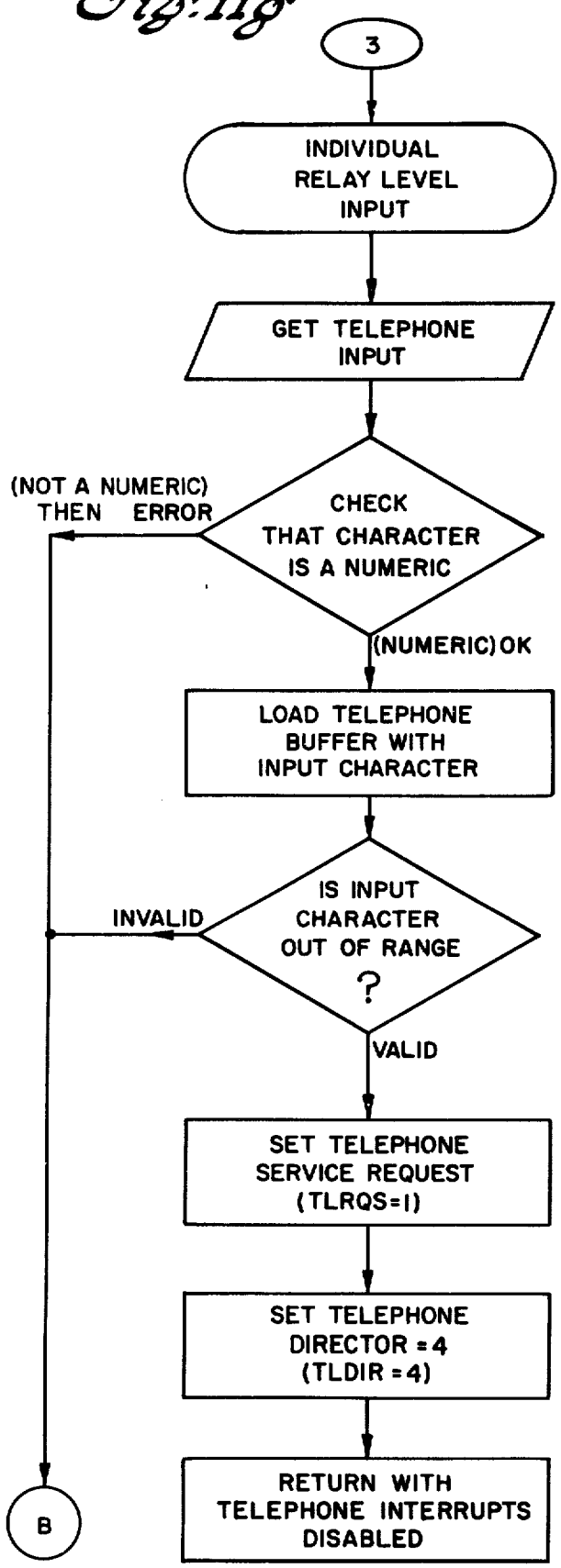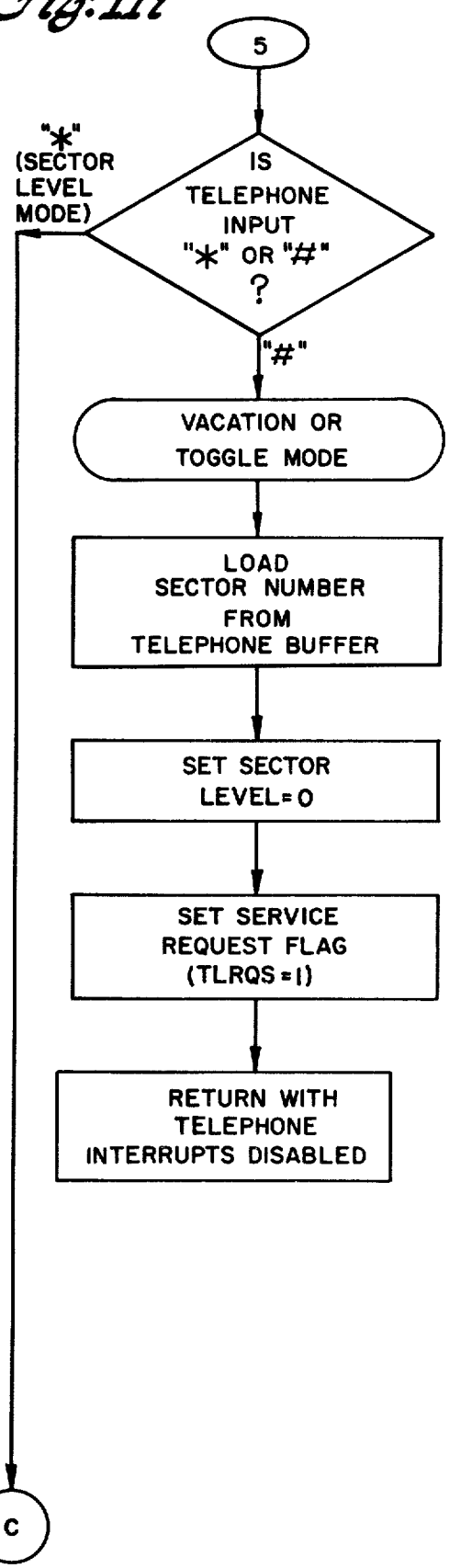

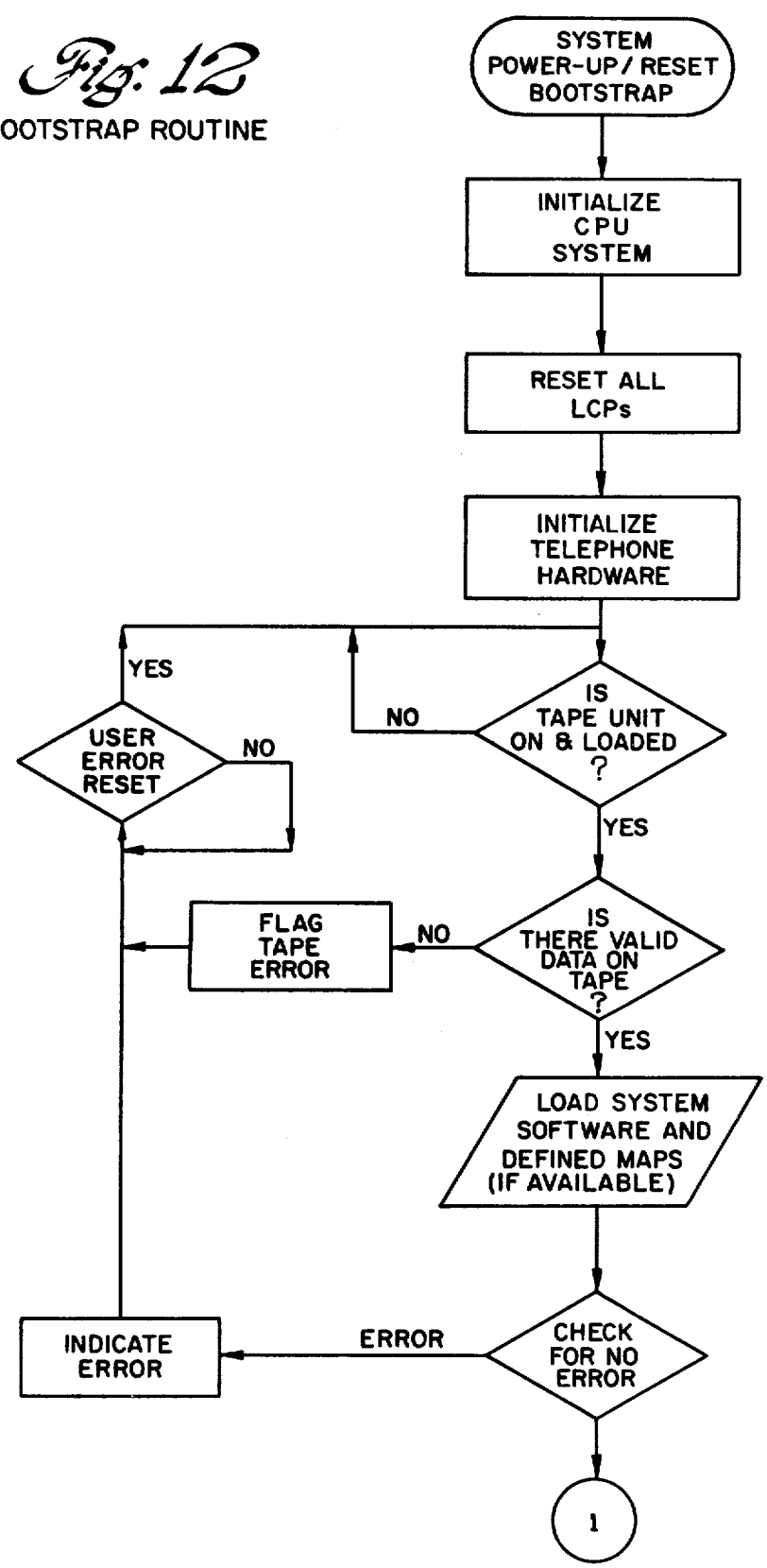

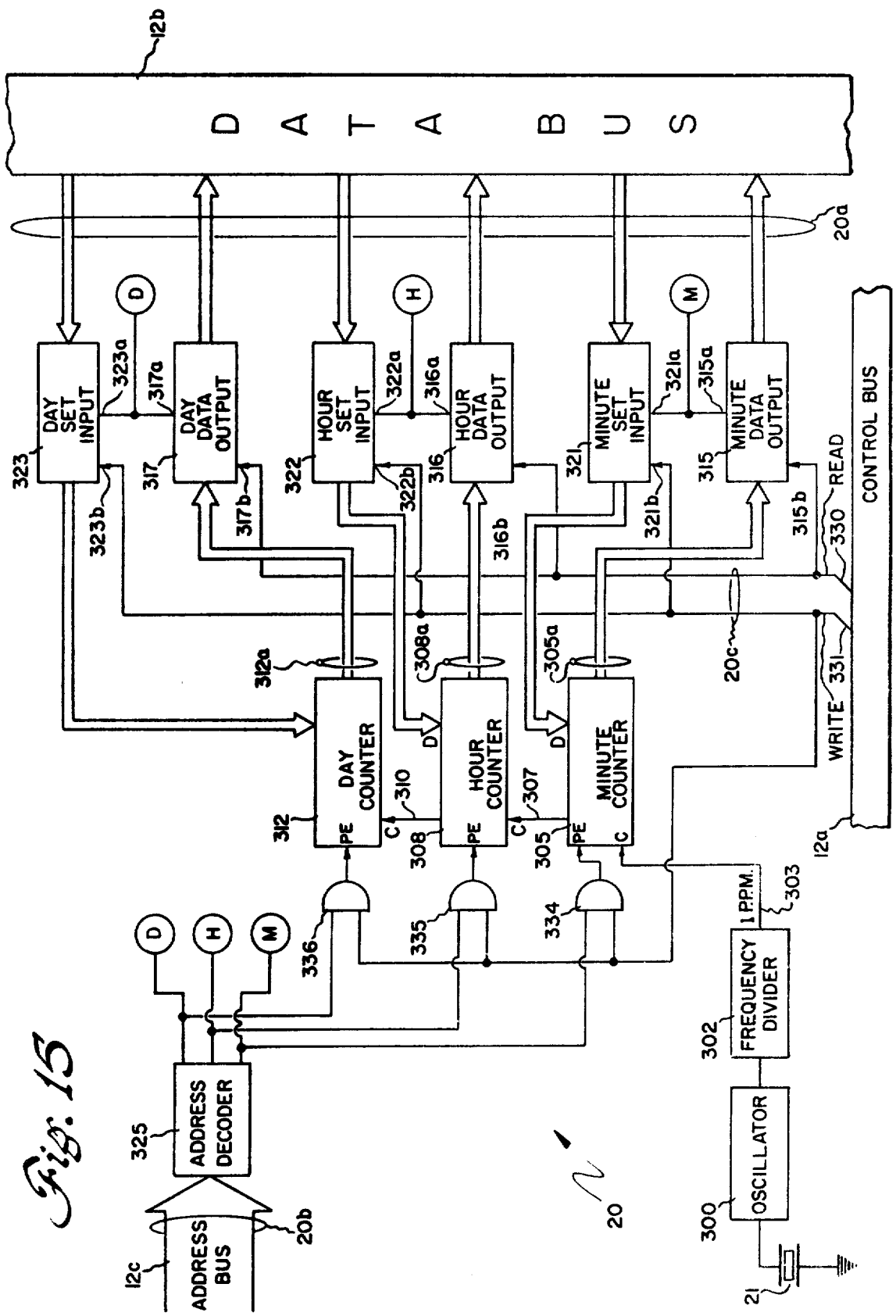

PROGRAMMABLE ENERGY LOAD CONTROLLER SYSTEM AND METHODS

This is a continuation, of application Ser. No. 871,989, filed Jan. 24, 1978, now abandoned.

BACKGROUND OF THE INVENTION

The present invention relates to systems and methods for controlling energy loads and, more particularly, to a novel programmable energy load controller system and methods capable of establishing the energy consumption state of a multiplicity of devices in accordance with one of a plurality of programmable maps.

It is known that the quantity of energy consumed, and the cost thereof, in a building can be minimized by allowing energy consumption to occur only at such times as benefit can be obtained therefrom. One approach to minimization of energy consumption in a building, such as an office building and the like, has been to utilize one or more employees, moving through the building, to switch off those loads which represent non-beneficial energy consumption. This approach does not, however, provide rapid control of energy consumption, due to the difficulty and expense of having personnel present at all loads at all times. An automatic system for controlling the energy loads is thus desirable.

BRIEF SUMMARY OF THE INVENTION

In accordance with the invention, there is provided a programmable energy load control system for controlling the energization and de-energization, as well as the establishment of a particular one of several levels of energization, of each of a multiplicity of energy loads. A central microcomputer facility includes a data storage memory of size sufficient to store a plurality of energization maps, indicative of the energization state of all of the loads at a particular time. The output of a real-time clock is compared to the implementation instruction for each map to cause the proper map to be implemented at the appropriate time, whereby each load is controllable to a deenergized condition or to a selected energized condition of a set of at least one such energized conditions. Battery backup means are utilized to maintain the timekeeping function of the real-time clock in the event of a power failure to the system; the clock is also addressable and may receive data from a user interface device, such as a data terminal and the like, to allow for entry of the correct time at system initialization. The user-interface device is also utilized to write program and load energization change information into the microcomputer facility memories; a separate interface allows a person at a remote location to access the central facility via the building's normal telephone lines to request temporary load energization changes at that, or another, location on a priority basis.

The central facility is coupled in electrical parallel connection to the input of each of a plurality of load control processors (LCP), each having a receiver/decoder with a unique address and means for controlling a plurality of energy switching devices located in the area adjacent to each LCP.

In one presently preferred embodiment, data is sent from the central facility to the paralleled LCPs in an error-self-checking format with each byte of address data being first transmitted in a complementary (inverted) form and thence in a true form, and with each LCP's receiver/decoder containing circuitry for storing the inverted byte for comparison with the true byte and issuing a reset to prevent enablement of operations requested by functional data bytes, if similarly ordered bits of the data-true and data-complement bytes are identical. The paralleled LCPs are driven by a media interface means having the capability for also providing a signal which causes all of the LCPs coupled thereto to enter a powersaver-mode, whereby a major portion of the LCP circuitry is deenergized, to reduce power consumption (and protect and increase the reliability of the components on the LCP) during time intervals when load changes are not being actuated. The central facility is configured to selfload the user-defined maps (plus any user-defined sectors and map schedules) stored in a magnetic tape unit, and also to operate in a power-up reset mode, whereby that one of a multiplicity of load-energization maps, then called for by the timing information available from the real-time clock, is enabled to define the state of each load controlled by the system, after a power outage.

One preferred embodiment of this system is utilized for controlling the states of a plurality of electric lighting loads in a building, whereby each load may be set to a predetermined state, e.g. on or off, by means of relays (referred to hereinbelow as the "relay" mode). As defined hereinabove, a second mode (hereinafter referred to as the "fixture" mode) can also be programmed wherein each lighting load has several discrete energy utilization states, such as a lighting load of the fluorescent-dual ballast type wherein each fixture is controlled by a pair of relays to one of three states: "Off" (both relays off); "Low" light intensity (one relay "on" and the other relay "off"); and "High" light intensity (both relays in the "on" condition). Each load control processor, having 16 output lines in our preferred embodiment, can control 16 lighting loads in the "relay" mode and 8 fixtures in the "fixture" mode, wherein each fixture requires two relays. Each of the relays is of the conventional self-latching type, whereby the relay will retain its present state, "on" or "off", until a new signal is applied thereto to change the state thereof.

In our preferred embodiment, the system causes the lighting load to be energized in selected patterns, under either a "MAP" mode or a "SECTOR" mode. In the "MAP" mode, one of a plurality of maps, each specifying predetermined states for each load, is programmed to be initiated at a specific time during specific days of the week; the maps are sequentially activated to be operative during a predetermined time interval. In the "SECTOR" mode, occupants of the building are enabled to override, by remote control, portions of the load patterns then currently in effect and established in accordance with the "MAP" mode. Preferably, this remote control "SECTOR" feature is accomplished by telephone interfacing with the central facility. Each lighting load in the building is assigned to at least one (and preferably several) sectors, each having a predetermined sector number and controlling a specific group of loads. A building occupant utilizes a desired sector number to modify the fixture energization patterns in a particular area, as required, and to incorporate greater flexibility in lighting usage.

Accordingly, it is an object of the present invention to provide a novel programmable energy load controller system and methods capable of automatically controlling the energy utilization state of each of a multiplicity of loads.

Another object of the present invention is to provide a programmable energy load controller system capable of storing a multiplicity of energization patterns affecting every controlled load in the system and placing a particular loading pattern into effect at a predetermined time.

Yet another object of the present invention is to provide a programmable energy load control system with capability to allow user modification of the state of individual portions of a pattern without affecting the remainder of the load energization pattern then implemented.

Still another object of the invention is to provide a novel system having means whereby a remote user can initiate a local override of an existing load pattern via an existing telephone system in the building served by the system.

A further object of the present invention is to provide a novel programmable energy load controller system capable of automatically energizing each of a multiplicity of energy loads controllable thereby to a proper condition upon restoration of power to a system from which power was previously accidentally removed.

These and other objects of the present invention will become apparent to those skilled in the art upon consideration of the following detailed description taken in conjunction with the drawings.

BRIEF DESCRIPTION OF THE DRAWINGS

FIG. 3 is a memory map for the system addressable memory;

FIG. 5 is a map of a portion of memory data base, illustrating the manner of storage of sector-definition information therein;

FIG. 7 is a map of a portion of the memory data base, illustrating the manner of storage of map definition information therein;

FIG. 9 is a memory map illustrating the manner in which time schedule information is stored in a portion of the memory data base;

FIGS. 10a-10f comprise a program flow chart for one preferred central system executive procedure for managing the large data base and coordinating the system activities;

FIGS. 11a-11i comprise a program flow chart for one preferred procedure for servicing a remote load energization change request received via the telephone interface;

FIG. 12 is a program flow chart for one possible bootstrap, or system-initialization, routine;

FIG. 15 is a schematic block diagram of one embodiment of a real-time clock for use in the system.

DETAILED DESCRIPTION OF THE INVENTION

Figure 1:
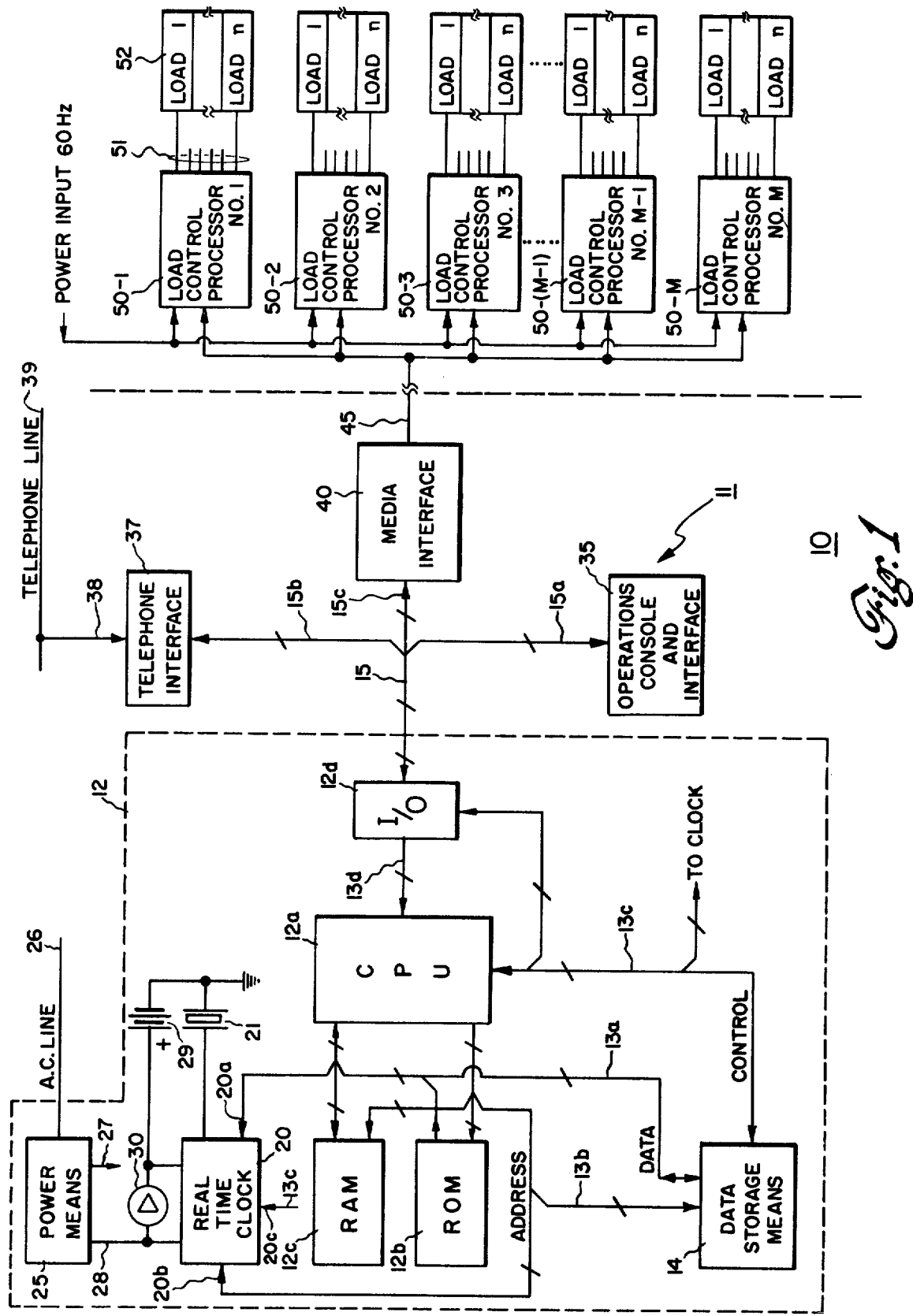
FIG. 1 is a block schematic diagram of a novel programmable energy load controller system in accordance with the principles of the present invention.

An overall block diagram is shown in FIG. 1 of one presently preferred embodiment of a novel programmable energy load controller system 10. A central facility 11, shown generally to the left of the vertical broken line, comprises a microcomputer 12, such as a standard INTEL MDS-800 microcomputer, containing a central processing unit (CPU) 12a; read-only-memory (ROM) means 12b (of about 6 kilobyte capacity), typically an INTEL MDS-406 PROM module in the microcomputer; read-write random-access-memory (RAM) means 12c (of about 17 kilobyte capacity); and an input-/output (I/O) means 12d including I/O means in the MDS-800 plus an additional INTEL MDS-504 I/O module in the microcomputer. The microcomputer also contains suitable multi-wire signal path structures, commonly known as a data bus 13a, an address bus 13b and a control bus 13c, interconnecting the CPU, ROM, I/O and RAM means, and an I/O bus 13d coupling the CPU and I/O means. The various parallel bus structures 13a, 13b and 13c are coupled to a mass data storage means 14, which may be a magnetic tape transport and controller, a magnetic disk, data cassette transport mechanism and the like, for storage of large quantities of data which may be written into and read from data storage means 14 via data bus 13a, under control of CPU 12a. Data storage means 14 may be physically located within microcomputer 12 or adjacent thereto, with proper coupling of the data, address and control buses thereto.

The data bus 13a is of the bidirectional type, whereby data may be read from data storage means 14 into temporary data storage means such as RAM 12c, or vice-versa, under control of CPU 12a and programs executed therein, in manner known to the computing arts. Data may be received in the microcomputer 12 via a parallel and/or serial input bus (or buses) 15 from sources external to the microcomputer.

Also contained within microcomputer 12 is a real-time clock module 20, utilizing a high-stability crystal element 21, to continuously and accurately establish the time-of-day (TOD) and day-of-week (DOW). Real-time clock means 20 is coupled to bidirectional data bus 13a at clock data port 20a, to address bus 13b at clock address port 20b, and to control bus 13c, at clock control port 20c, to facilitate entry of clock starting time data upon energization of the load controller system of the present invention, and to facilitate reading the TOD and DOW data from clock means 20 when the clock means is interrogated with address codes, at port 20b, corresponding to the unique address codes previously assigned to the clock. Real-time clock means 20 is advantageously fabricated upon a printed circuit board, or other like means, of similar size as that used for mounting the components of the other portions of the microcomputer, and the real-time clock means, along with its timing element 21 and a rechargeable battery means 29, is physically positioned within the confines of the microcomputer at the central facility.

A power supply means 25, typically a part of the basic MDS-800, is coupled to the AC power line 26 in the building housing the central facility and is coupled to the microcomputer 12, via connections 27 and 28, to provide the required operational voltages and currents. DC power connection 28 provides the real-time clock with operating power derived from the commercial power means, and is coupled to a back-up battery 29 via a battery charging circuit 30 which allows charging current to flow easily in the direction of the battery such that in the event that AC mains power is lost for any reason, the battery is isolated from means 25 and remains coupled only to real-time clock 20 to assure that the timekeeping function of the clock is maintained. Upon reestablishment of mains power, a bootstrap program (discussed hereinbelow) directs the CPU to place on address bus 13b the sequential addresses of the clock portions storing TOD and DOW data such that the system will then implement the load energization pattern required for that particular time.

An operations console and interface 35, such as a General Electric TERMINET 30 ® data terminal and the like, is generally physically located near the central computer and is coupled to the I/O bus via bus portions 15a and thence to I/O means 12d of the computer. Console 35 allows system personnel to load, debug and/or modify system programs as welll as perform computer diagnostic routines, as required, and in manner known to the art.

A telephone interface means 37, such as a standard AT&T 407A data set and the like, receives tone-coded serial data, coupled via bus 38 to a telephone line 39, which may be a dedicated telephone number in a building-wide telephone system and the like, and decodes this data prior to coupling the data via a portion 15b of the I/O bus to the computer, in manner known to the art.

The central facility is substantially completed by a media interface means 40 serving to couple a portion 15c of the I/O bus to transmission media 45 serving to carry signals representative of data to and from the central facility and the inputs of each of a plurality of remotely-located load control processors 50-1 through 50-M. Media 45 is preferably a cable running between media interface 40 and each of the parallel inputs of the load control processors 50. In our preferred embodiment, transmission medium 45 is a pair of twisted wires, although a coaxial cable may be equally as well utilized.

Thus, I/O means 12d may have at least the following I/O port assignments:

| I/O PORT ASSIGNMENT TABLE | | | |
|---|---|---|---|
| PORT NO. | CONTROL LINE | ASSIGNMENT | ADDRESS |
| 1 | Output | Terminet ® and Mass Storage Control | OF7H |
| 2 | Input | Terminet ® and Mass Storage Status | OF7H |
| 3 | I/O | Terminet ® and Mass Storage Data | OF6H |
| 4 | Input | Mass Storage Status Flags | O23H |
| 5 | Output | LCPs Data | OF4H |
| 6 | Output | Interface Data (PSUR, etc.) | OF5H |

| -continued | | | |
|---|---|---|---|
| I/O PORT ASSIGNMENT TABLE | | | |
| PORT NO. | CONTROL LINE | ASSIGNMENT | ADDRESS |
| 7 | Input | Interface Status | OF5H |
| 8 | Input | Telephone Data | O21H |
| 9 | Input | Telephone Interface Status | O22H |
| 10 | Output | Telephone Interface Control | O21H |

Each load control processor 50 is assigned an address unique to that load control processor (LCP), even if more than one load control processor is physically located at the same location within the facility. Each of load control processors 50, when properly addressed and enabled, decodes function data transmitted from the central facility thereto, for energization of combinations of the LCP output lines 51 to enable or disable one of a plurality (n) of loads 52 coupled to each LCP. Additionally, in our preferred embodiment, each LCP is configured to not only enable and disable energy consumption by one of the n loads coupled thereto, but also, when our energy load controller system is utilized for controlling lighting functions and the like, to enable each lighting load (a single fixture, bulb and the like) to one of a plurality of different energized conditions. Thus, where a single lighting fixture contains a lighting load capable of being switched between the "off" condition, a low-light "on" condition and a high-light "on" condition, the load control processor associated with each such load is configured to properly place that specific load in the desired one of the plurality of possible energy consumption states.

In our preferred embodiment, each of the M×n loads is a latching relay associated with either the on-off function or a high lighting level/low lighting level function of each one of a plurality (M×n/2) of lighting fixtures provided in at least one building to be controlled by our novel system. The number of fixtures controlled by a single LCP is related to the number of states of energy consumption definable per fixture; the number of bits in a data word defined for the particular CPU utilized in computer facility 12; the number of function words to be transmitted in a single message to the paralleled plurality of LCPs; and the particular design of the LCP. In the embodiment herein illustrated, the INTEL MDS-800 microcomputer utilizes the well-known 8080 CPU integrated circuit, for which the data word is defined as being 8 bits (1 byte) wide. We have arbitrarily chosen that only two data words be sent in serial fashion to each uniquely addressed one of the LCPs; each lighting fixture requires information contained in two binary data bits (the "on/off" function bit and the "high-low" function bit) whereby the "on/off" states of a set of eight fixtures are controlled by a first data byte and the "on-hi/on-lo" states of the eight fixtures are controlled by the second byte of the preferred two-byte sequential data function message. Of course, it should be understood that other CPUs may be utilized, whereby a particular data word may have more or less bits and that a single data word, or more than two data words in succession, may be as easily transmitted to the parallel multiplicity of LCPs; other microprocessor CPUs are well known to the art, having four, twelve or sixteen bit data words, and minicomputers and large mainframe computers having data words up to at least sixty-four bits are also known-these CPUs may be utilized within the intent and spirit of the present invention. It should also be understood that other specific load control coding arrangements may be utilized, e.g. a lighting load having an "off" and three "on" conditions (such as a common three-way incandescent bulb and fixture therefor), which four energy utilization state combinations may be coded with the appropriate ones of the four possible combinations available from two sequential binary digits. Similarly, other common non-lighting types of energy consumption loads may be controlled to a lesser or greater degree of possible states, e.g. air conditioning duct dampers may be controlled to one of eight air-flow positions, including zero air flow, by suitable choice of combination of three binary digits in a data word, and so forth.

Figure 2:
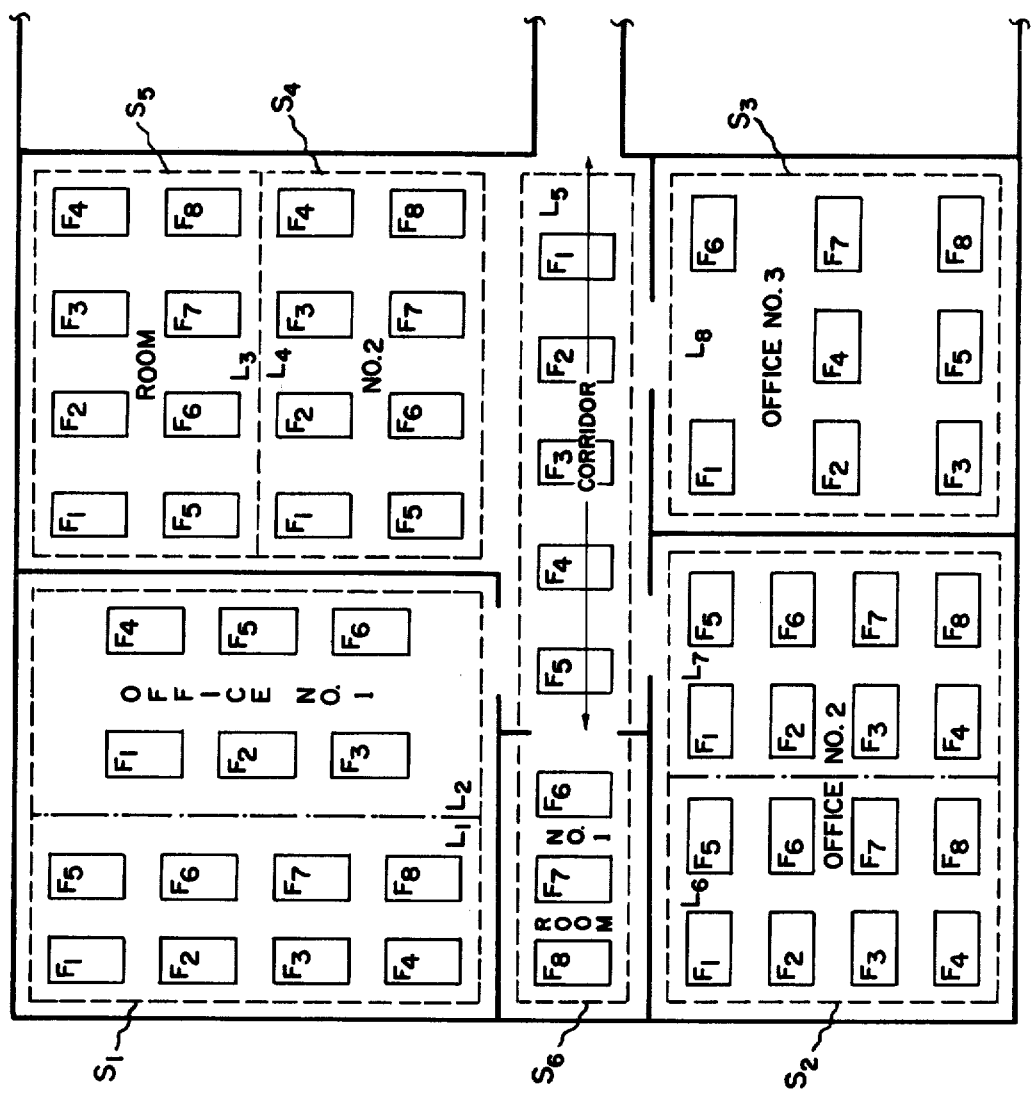
FIG. 2 is a hypothetical building floor plan, useful in defining certain concepts relating to the present invention.

Referring now to FIG. 2, the floor plan of a hypothetical building provided with the energy load controller system of the present invention, is shown for purposes of illustration of several of the principles and definitions associated with the invention. As seen in FIG. 2, there are three offices (office no. 1 in the upper left hand corner, office no. 2 in the lower left corner and office no. 3 in the lower right corner), two rooms (room no. 1 at the center left and room no. 2 at the upper right) and a central corridor. Each of the corridor, rooms and offices contains some number of fixtures, with up to eight fixtures being associated with a particular load control processor. Thus, fixtures $F_1-F_8$ at the left end of office no. 1 are associated with a first load control processor $L_1$, while the remaining six fixtures $F_1-F_6$ at the right side of the office are associated with a second load control processor $L_2$. Similarly, the eight fixtures $F_1-F_8$ at the upper end of room no. 2 are to be controlled by a third LCP, $L_3$; the eight fixtures at the lower end of room no. 2 are to be controlled by another LCP, $L_4$; the eight fixtures in both the corridor and room no. 1 are assigned to a fifth LCP, $L_5$, and the left half of office no. 2 is to be controlled by LCP-$L_6$, with the right half of the same office being controlled by LCP, $L_7$ and office no. 3 having all of its eight fixtures controlled by another LCP, $L_8$. It is seen that a load processor may, but need not, have a full complement of loads coupled thereto, as shown by processor $L_2$ in office no. 1; that the number of load control processors utilized in a particular area is dictated by the number of controllable loads therein; and that a single load control processor may control loads in several adjacent, but physically distinct, locations (as shown by processor $L_5$ controlling loads both in room 1 and the central corridor).

A physically distinct unit, such as an office or room (or portions thereof) within a building may be recognized as constituting a sector, for which energy control would typically encompass all fixtures therewithin. Thus, a first sector $S_1$ may encompass the fourteen fixtures within office no. 1, including the eight fixtures $F_1-F_8$ controlled by load processor $L_1$ and the six fixtures $F_1-F_6$ controlled through load processor $L_2$. Similarly, a second sector $S_2$ may be defined within office no. 2 and comprises the loads controllable via load control processors $L_6$ and $L_7$. A third sector $S_3$ corresponds to the loads controllable via load processor $L_8$ and physically located within office no. 3. The designation of a particular sector may, as hereinabove explained, encompass all or part of one or more load control processors and the loads associated therewith, within a single room or other physically constrained portion of the building; similarly, a sector may be defined as a portion of a room, such as sectors $S_4$ and $S_5$, respectively, consisting of the fixtures associated with load processors $L_4$ and $L_3$, respectively in room no. 2. The user may equally as well define a sector, such as sector $S_6$, to comprise the fixtures associated with a load control processor such as $L_5$, where the controllable loads are contained within two (or more) physical distinct areas, such as room no. 1 and the corridor in the example of FIG. 2.

The list of energization states of each fixture associated with each load control processor at a particular time is herein referred to as a map. In our preferred embodiment, up to eight maps may be transferred to RAM memory 12c from data storage means 14 (FIG. 1) after system powerup, and the maps thence remain in RAM means 12c to facilitate reimplementation of a particular map by establishing a correspondence between the time in the real-time clock 20 and the implementation time program used for actuation of the particular map. For purposes of illustration, three hypothetical maps follow below and are predicated upon a lighting control system operating in the "fixture" mode, i.e., utilizing a first relay for establishing the "on" and "off" state of a particular fixture and a second relay for establishing the "low" or "high" state of that fixture, for each fixture associated with a particular load control processor. It should be understood that the control mode is definable in this preferred embodiment such that the user can specify "fixture" e.g. high/low (2 relays) control or individual "relay" e.g. on/off (1 relay) control.

MAP A
ENABLE:TOD-0800, DOW-M, T, W, Th, F

| SECTOR | LCP | LOAD STATES | (H1=2, LO=1, OFF=0) |
|---|---|---|---|
|  |  | 8 7 6 5 4 3 2 1 |  |
| $S_1$ | $L_1$ | 1 1 1 1 1 1 1 1 | ENERGY UNITS |
| $S_1$ | $L_2$ | X X 2 2 2 2 2 2 | 38×2 |
| $S_2$ | $L_6$ | 0 1 1 0 1 2 2 1 | 22×1 |
| $S_2$ | $L_7$ | 1 2 2 1 1 2 2 1 | 2×0 |
| $S_3$ | $L_8$ | 2 2 1 2 2 2 2 1 | 98 |
| $S_4$ | $L_4$ | 2 2 2 2 2 2 2 2 |  |
| $S_5$ | $L_3$ | 2 2 2 2 2 2 2 2 |  |
| $S_6$ | $L_5$ | 1 2 1 1 1 2 2 2 |  |

MAP B
ENABLE:TOD-1730, DOW-M, T, W, Th, F

| SECTOR | LCP | LOAD STATES |  |
|---|---|---|---|
| $S_1$ | $L_1$ | 0 0 0 0 0 0 0 1 |  |
| $S_1$ | $L_2$ | X X 2 2 1 2 2 1 | ENERGY UNITS |
| $S_2$ | $L_6$ | 0 0 0 0 0 0 0 0 | 6×2 |
| $S_2$ | $L_7$ | 0 0 0 0 0 0 0 0 | 16×1 |
| $S_3$ | $L_8$ | 0 0 0 0 0 0 0 0 | 40×0 |
| $S_4$ | $L_4$ | 0 0 0 0 0 0 0 1 | 28 |
| $S_5$ | $L_3$ | 0 0 0 0 0 0 0 0 |  |
| $S_6$ | $L_5$ | 0 0 1 0 0 1 0 0 |  |

MAP C
ENABLE: TOD-1830, DOW-M T, W, Th, F

| SECTOR | LCP | LOAD STATES |  |
|---|---|---|---|
| $S_1$ | $L_1$ | 0 0 0 0 0 0 0 0 |  |
| $S_1$ | $L_2$ | X X 1 0 0 0 0 0 | ENERGY UNITS |
| $S_2$ | $L_6$ | 0 0 0 0 0 0 0 0 | 0×2 |
| $S_2$ | $L_7$ | 0 0 0 0 0 0 0 0 | 4×1 |
| $S_3$ | $L_8$ | 0 0 0 0 0 0 0 0 | 58×0 |
| $S_4$ | $L_4$ | 0 0 0 0 0 0 0 1 | 4 |
| $S_5$ | $L_3$ | 0 0 0 0 0 0 0 0 |  |
| $S_6$ | $L_5$ | 0 0 1 0 0 1 0 0 |  |

As will be seen by reference to the three sample maps, a total of 98 units of energy are expended during the normal working hours when map A is implemented, with only 28 energy units being expended (MAP B) for a short period of time after the normal working day ends, to accommodate those employees still within the area shown in FIG. 2; and only four energy units are required for providing some minimal lighting level at other times when employees would normally not be expected to be in this area. An employee, by accessing the central facility via tone-coded digits from a local phone, which are converted to 2-out-of-8 encoded data by the telephone interface 37, can enter a particular sector number. The telephone data on I/O bus portion 16b is given a priority interrupt status, when received at CPU 12a, and is immediately implemented as temporary loading pattern changes to the map then in effect. The changes received by telephone are not, however, permanently stored and do not permanently change the maps stored in mass storage memory 14.

Thus, the "SECTOR" mode is entered by a building occupant overriding a portion of the previous established lighting load pattern by establishing a telephone connection with the central facility and transmitting a predetermined sector code thereto by means of tone combinations decoded by the telephone data set in the telephone interface and change instructions. In the "SECTOR" mode, the lighting pattern for each predefined sector may be modified; further, the system advantageously allows an overlapping of sectors, i.e. the defining of more than one sector to include a particular lighting fixture. In our preferred embodiment, any single light fixture may be included in the definition of up to four different controllable sectors. For example, one user-definable-and-controllable sector $S_{10}$ may comprise the six fixtures $F_1$-$F_6$ of the second load control processor $L_2$ in office number 1, plus the third fixture $F_3$ controlled by the fifth load control processor $L_5$ in the corridor. (It should be noted that the digital information defining sector $S_{10}$ will now consist of the digital word addressing LCP $L_2$, for controlling the six fixtures attached thereto, and a second digital word addressing LCP $L_5$ to control the third fixture coupled thereto). Further, the fixture $F_3$ coupled to LCP $L_5$ may also be included in the sector definition of three additional sectors, e.g. sectors $S_{11}$, $S_{12}$ and $S_{13}$, which respectively also include predefined energization information for, e.g. fixtures $F_5$-$F_8$ of LCP $L_3$, for sector $S_{11}$; fixtures $F_6$-$F_8$ of LCP $L_8$, for sector $S_{12}$; and fixtures $F_1$ and $F_5$ for each of LCPs $L_6$ and $L_7$ in sector $S_{13}$, by way of example. It is seen, therefore, that the present novel energy control system and methods therefor, particularly as applied to lighting loads, provides an extremely high degree of versatility, due in part to the use of the telephone interface to modify the energy utilization condition of each load or fixture in each sector.

Referring now to FIG. 3, a map of the memory space addressable by the 8080-type microprocessor, as used in the preferred INTEL MDS-800 microcomputer, shows that for a sixteen bit wide address bus, a total of 65,536 data words, (each one byte wide) can be addressed, from a starting address of $0000_H$ to a final address of $FFFF_H$, where the subscript H indicates the hexadecimal numbering system, between digits 0 and F. This total memory space must store a bootstrap routine, to enable program loading, which bootstrap is commonly stored in ROM memory (as the routine does not change with a change in either program or data) and begins at the initial memory address $0000_H$, and extends over a certain number of bytes, e.g. 256 bytes to final address $00FF_H$. The remainder of the memory space is utilized for storage of the operating program, which may be partially stored in RAM (as in the memory space immediately above address $00FF_H$); in ROM, for that portion of the program in which changes are never to be made (as that portion of the memory starting at address $8000_H$); or a combination of the two, as illustrated. A portion of the memory space will also be occupied by at least some part of the data base, always stored in RAM, e.g. that portion of the memory ending at memory address $3FFF_H$.

Figure 4:
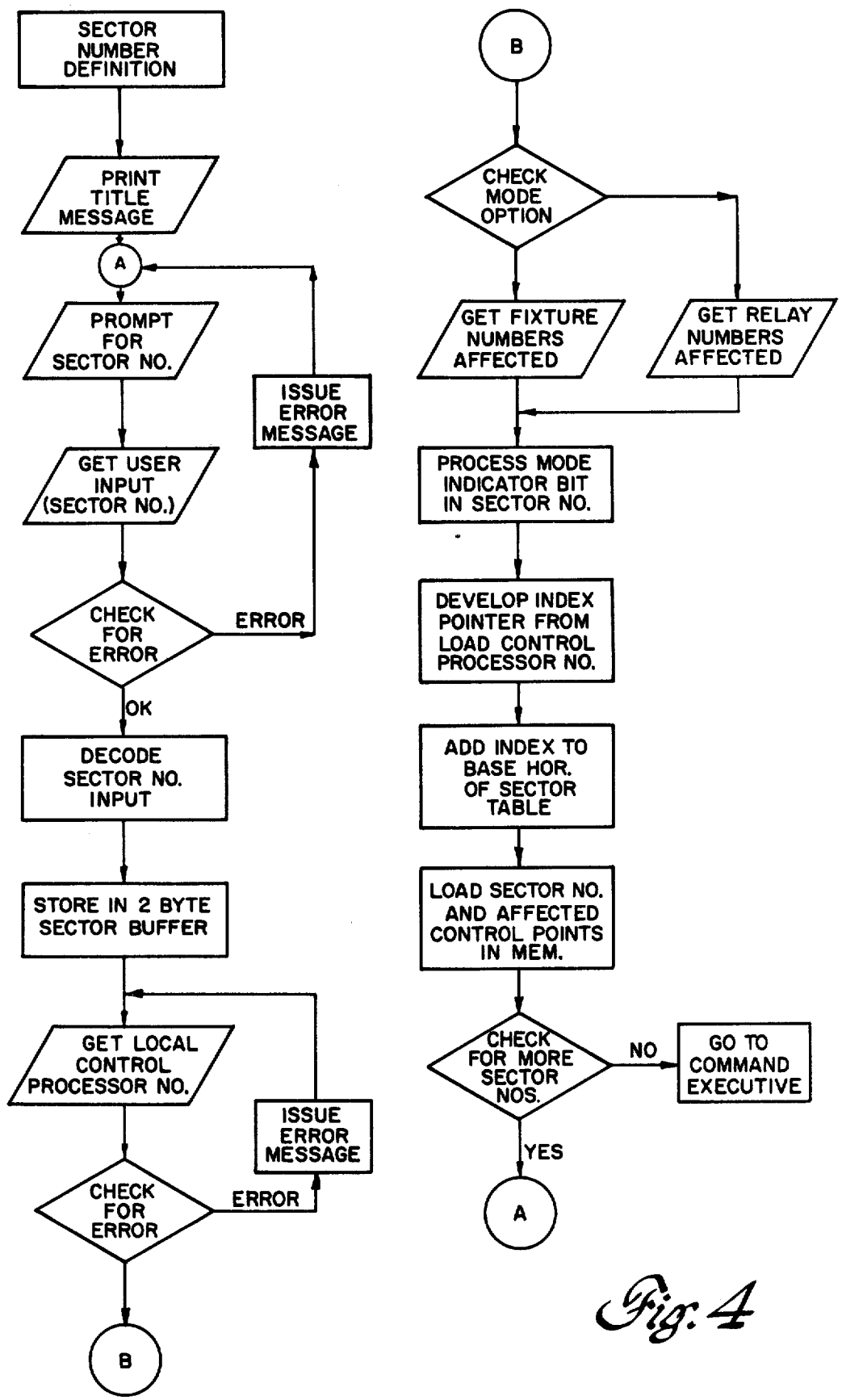
FIG. 4 is a program flow chart for one possible procedure allowing definition of sectors for modification of energization states of all loads in each of a plurality of sectors.

Referring now to FIGS. 4 and 5, the system advantageously is programmed to allow the user to define each sector in the controlled building or facility, and contains English language messages prompting and guiding, in an interactive manner, the user to supply the required information at the proper time.

The system operates in one of three modes: the system definition mode; the system executive (management) mode; and the power-up/reset mode. In the system definition mode, the user personnel hold an English-like conversation with the central computer facility, which facility guides the operator through each step of defining the various sectors, maps and timing by indicating the required inputs to be entered by the operator in each of the definition procedures. The system (command) executive routine allows automatic operation of the system in the event that user personnel are not in communication with the system; the system reverts to the command executive in normal operation.

In the sector definition routine of the system definition mode, user personnel define those fixtures associated with each sector, by sector number, LCP number and either the fixture numbers or the individual relay number (depending on the definition mode) to be assigned thereto. Thus it is seen in FIG. 4 that selection of the routine for sector number definition causes the central facility to print a title message upon the operations console 35, and to prompt the operator to enter the sector number. Upon input, by user personnel, of a decimal-based sector number, this number is converted to a binary number and temporarily stored in a two-byte software buffer after being checked for errors. The system then asks user personnel for the number of a load control processor which will be in the sector previously defined, and for the fixture and relay numbers to be affected. Upon entry of the called-for information, the system definition rountine generates a four-byte encoded word for loading into an area of memory known as the sector table (FIG. 5). The exact location of a particular entry in the sector table is given by adding a base address, i.e., the starting address SA of the sector table, to an index address determined by the number of the LCP affected. The four-byte word includes the two-byte sector number address, taken from a temporary buffer, and includes a two-byte word defining the affected control points in accordance with the load control processor number, fixture number and relay number information entered by the operator. Upon loading of affected control point and associated sector number information in memory, the system definition program prompts the user personnel to enter further sector definitions and cycles through the above procedure as such definitions are presented, or, if no further definitions are presented, reverts to the command executive program and continues to operate the system automatically in accordance with the data now stored in system memory. In this manner, sector $S_1$ may be defined by a sixteen bit binary number having its low order byte entered as the first byte of the four-byte word and its high order byte entered as the second byte of the four-byte word in accordance with the data formating procedure utilized with the particular microprocessor, the 8080, used in this embodiment. The binary representation for the associated load control processor, e.g. $L_1$, and the particular fixture, e.g. $F_6$, as well as the state of each of the relays, e.g. the "on/off" and "high/low" relays, associated with that fixture of that LCP, is represented by a second sixteen-bit word formed of a low order-affected control point byte, containing "on/off" data for the 8 associated fixtures, and a high order-affected control point byte, containing "hi/lo" information about the same sequence of 8 fixtures with these types being sequentially stored.

Figure 6:
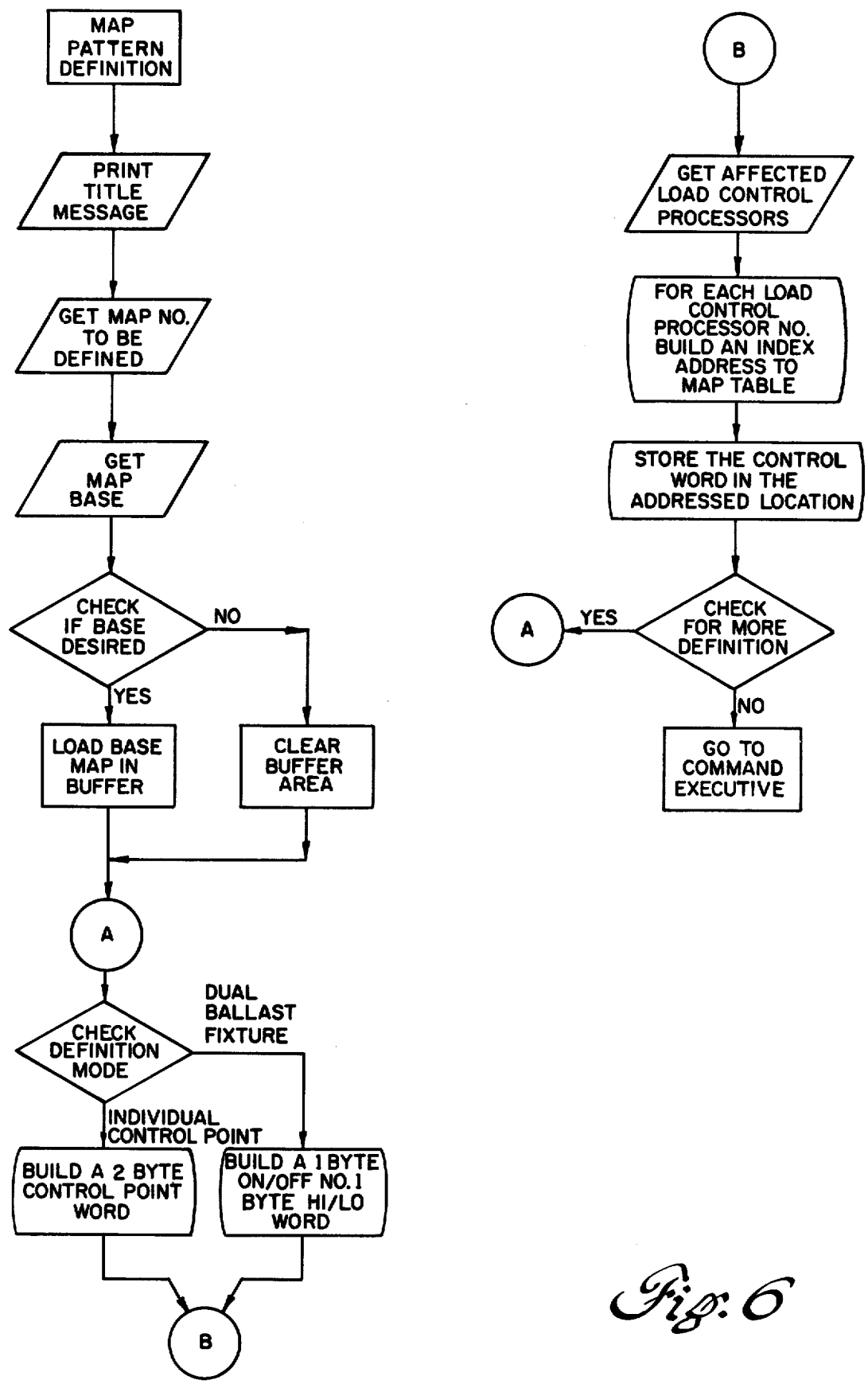
FIG. 6 is a program flow chart for one possible procedure for defining each of a plurality of energization map patterns.

In somewhat analogous manner, each of a plurality of energization maps and map starting times are defined. FIG. 6 illustrates the program flow for defining a map pattern and commences with the operator calling for the map definition mode, whereupon the console prints a map definition title message and requests the map number to be defined. In this preferred embodiment, a total of $8 = 2^3$ maps are allowable. The operator enters a letter, A-H, to select/name the desired map and the computer prompts the operator for the particular map base desired, i.e. whether a prexisting map base is to be displayed for modification or whether a new map base is to be generated. Thus, when the operator names a map pattern to be defined and also specifies whether an existing map pattern is to be used as a base for the new map pattern, a memory buffer is either initialized with the old map specified as the base or is cleared to facilitate creation of a new map. The operator now enters the states of the fixtures associated with each load control processor. As an example, in previously given map A, a specific load control processor $L_6$ in the second sector, $S_2$, is to have its fixtures $F_1$ through $F_8$ energized in the following pattern low, high, high, low, off, low, low and off. Representing each fixture by two similarly placed bits, with the bit in the first (low) byte indicating the on-off state and the same bit in the second (high) byte indicating the high-low state, the control word for these eight fixtures is the two-byte pattern:

(LOW BYTE) 01101111   (on/off)
(HIGH BYTE) 00000110   (hi/lo)

This word is loaded as the hexadecimal data, e.g., $066F_H$, in the memory map of FIG. 7. The starting address SA' of this particular control point block is based upon the address of the associated load control processor, e.g., $L_6$, as an index and is added to the base address of the control point loading pattern to point to the actual block address SA' where the word is stored. When the load control processor word is completed, the control word is stored in the address location and the system definition routine returns for further user-input definitions. Upon completion of user input, the system reverts to the command executive for automatic system operation, while the defined map data base is transferred from the map software buffer into memory. As the map pattern has stored addresses determined by index and relative addressing concepts, the map definition table can be loaded in any predetermined memory location and can be retrieved by defining the starting address of the map.

Figure 8:
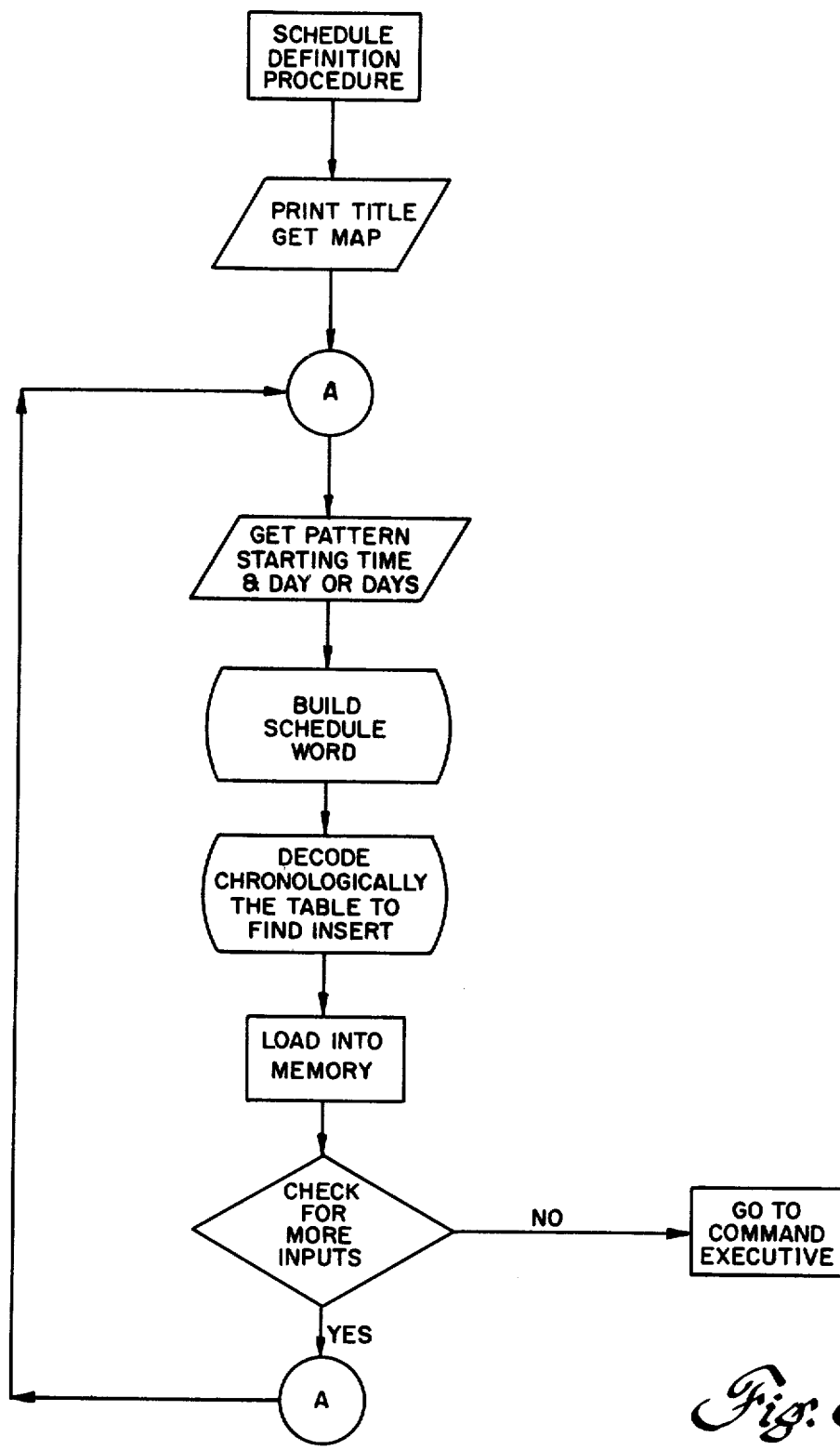
FIG. 8 is a program flow chart illustrating one possible procedure for loading a timing schedule into the data storage memory.

The schedule definition procedure (FIG. 8) is similar to the sector and map definition procedures, in that the schedule procedure is selected by the operator and the system prompts for schedule information. The system operator enters the designation of the particular map whose schedule is to be defined and then enters the time of day and day of week information defining when that particular map is to be implemented. The system definition program then builds a three-byte word relating the map number, the date of the week and the time of the day and stores this word, represented as in FIG. 9, in a pattern schedule table in memory, wherein the time schedules are arranged in chronological order. The chronological schedules are established beginning at some storage address SA", whereby the addresses may be permanently programmed into ROM means if the map time schedule will be invariant. It should be understood that time scheduling information may be programmed into RAM (for subsequent storage in the mass data storage means 14 until requested under program control) or may be implemented in semipermanent storage means, such as EPROMs or EAROMs, configured to have the appropriate starting address SA". The use of EPROMs and the like allows the system operator to merely replace a single integrated circuit to completely modify the time scheduling of the system, which provides a useful manner in which the system may be reconfigured during vacation schedules and the like, without the time-consuming task of manually entering a new map schedule portion of the data base.

Referring now to FIGS. 10A-10F, a flow chart for the command executive routine is shown. As will be seen, the system executive is a continuously cycling program which starts out with subroutine 1 thereof initially checking the activity of the device used for operations console and interface 11. If such device is active, signifying that user personnel are attempting to communicate with the central computer facility, the system executive routine proceeds to interact with the console and process the information or requests therefrom. When console servicing is complete, the command executive opens the I/O port, via I/O line portion 15b, to the telephone, or map override, interface 37. If a request to override a portion of the map then in effect is present on telephone line 39, the system executive receives the change information and decides whether a telephone requested map override presently in effect is to be eliminated or whether a new map override is to be inserted into the map program. In either case, a new set of override flags are generated and data is established to indicate which receiver/decoder (REC/DEC), or set thereof, is to be addressed and which loads controllable thereby are to be affected. Once this data is inserted into memory, or if no change in a map override is requested, the system executive checks the entire map then in effect for recognition of all overrides thereto. If one or more map overrides are in effect, the system command executive enters subroutine 4 thereof, to be discussed hereinbelow; if a map override is not in effect, the system command executive checks the validity of the real-time clock data; if the data is not valid the routine exits to subroutine 2, discussed hereinbelow. If the real-time clock data is valid, the routine determines which map is then scheduled to be effective at the time read from the real-time clock 20 and checks that map against the current map in effect (CURMP). if the CURMP is correct for the time information received from real-time clock 20, no change is required and the routine continues; if a map change is required the routine begins installing the new map and sets a map processing flag (MAPFL) to prevent receipt of outside-originated map change requests and implementation thereof. If the MAPFL flag is set, the routine goes to subroutine 4 to format data for transmission to the various receiver decoders of the multiplicity of remote LCPs, to effectuate the map change. If a map change is not in progress the routine exits to subroutine 2.

Figure 10B:
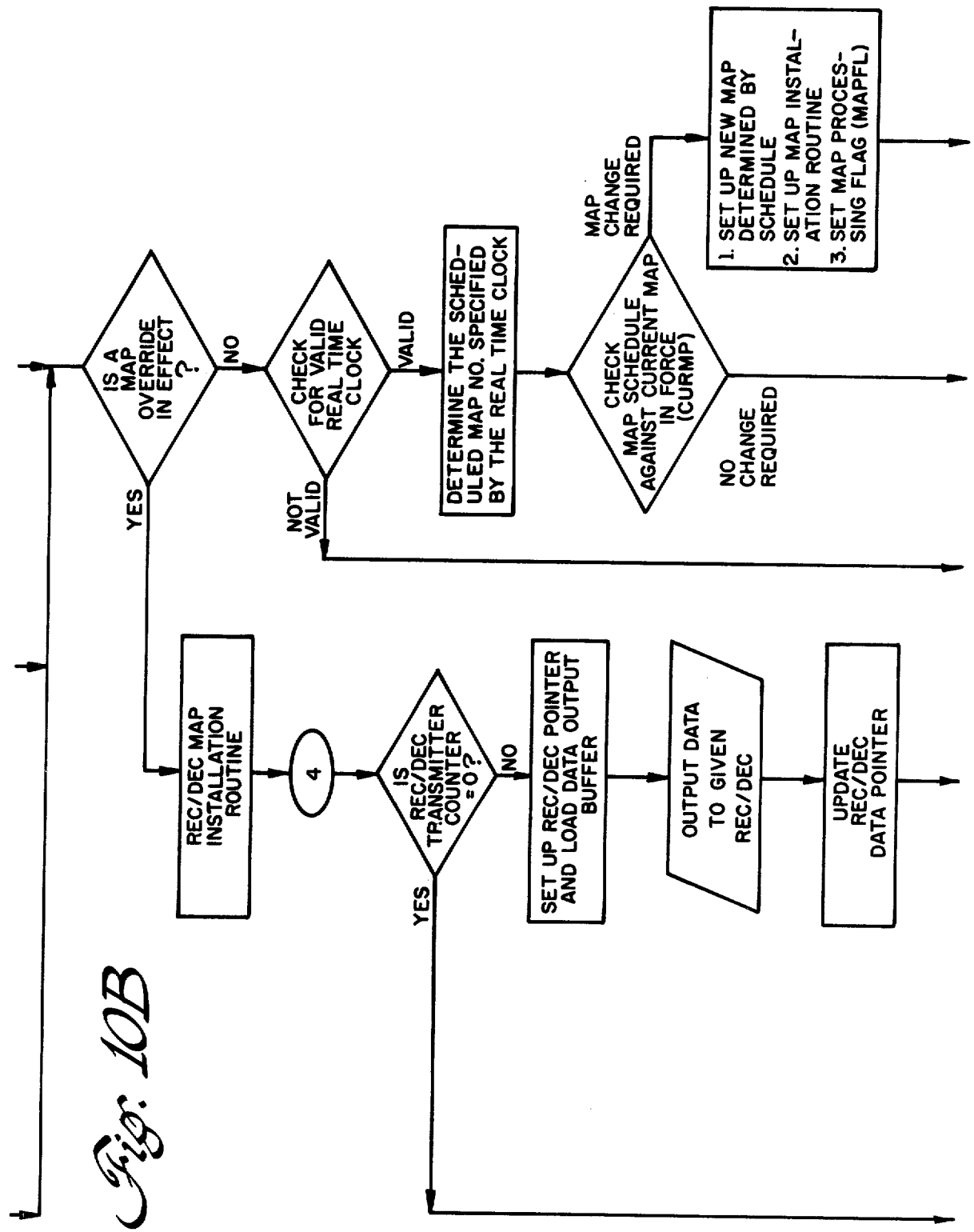
Figure 10C:
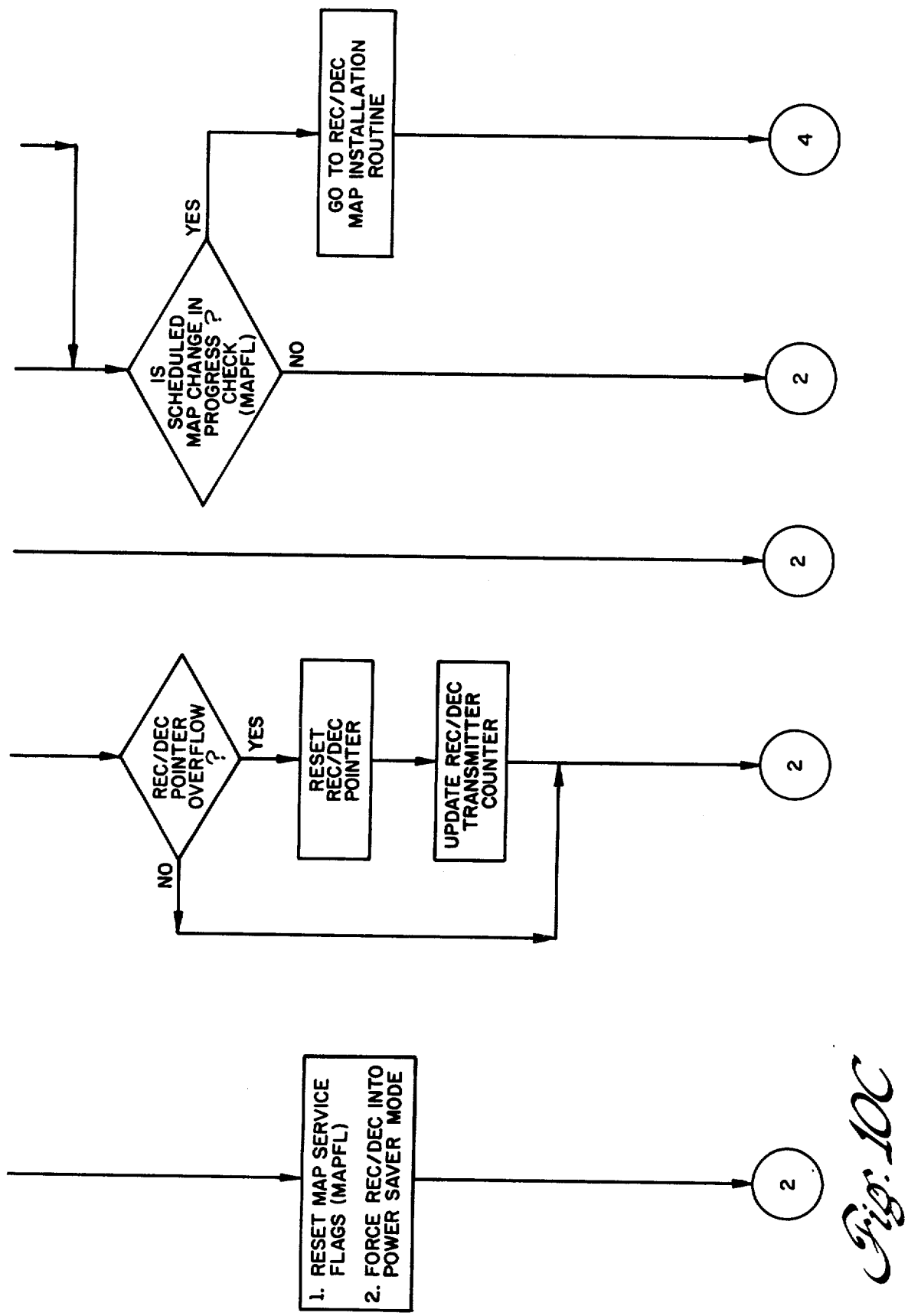
Figure 10D:
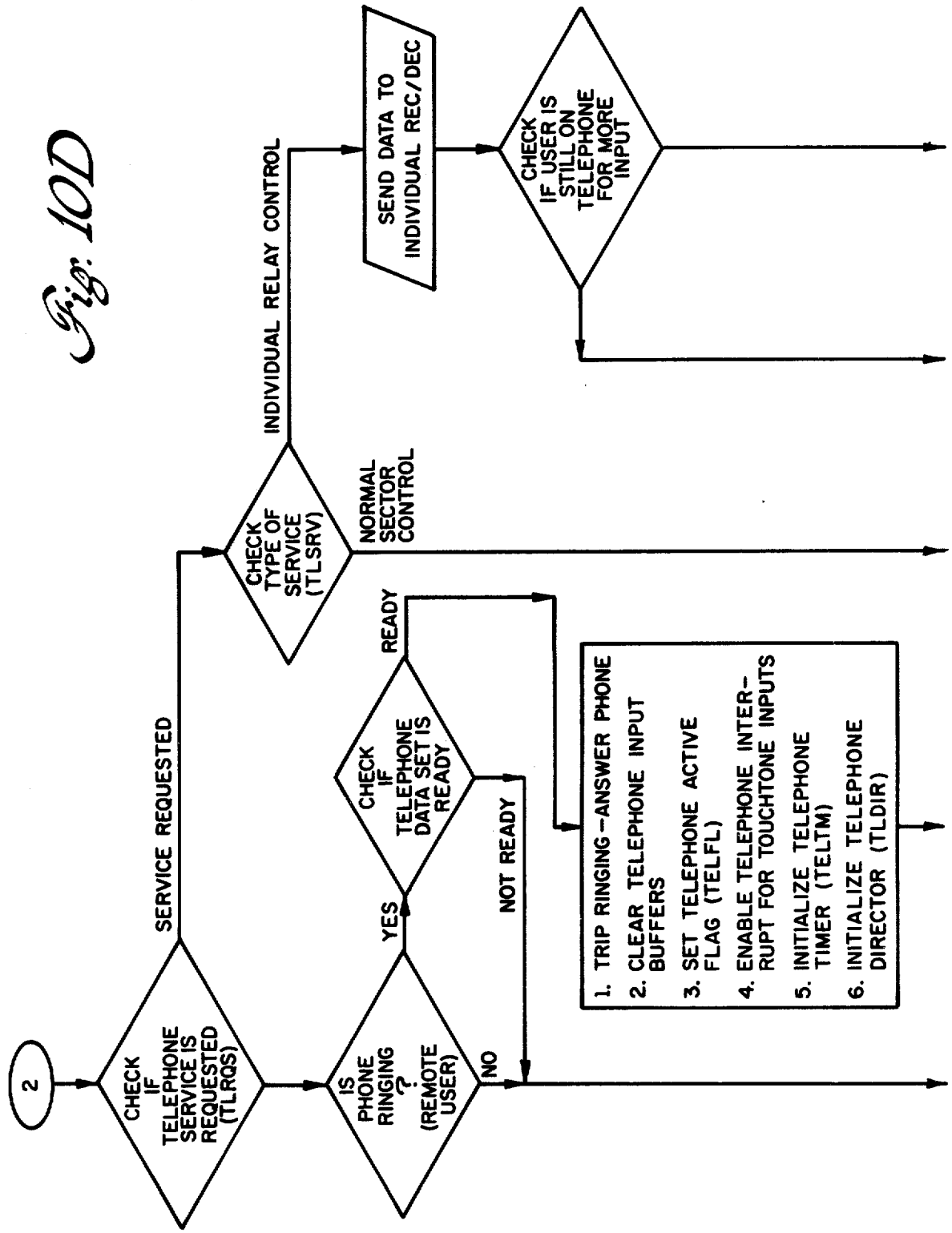
Figure 10F:
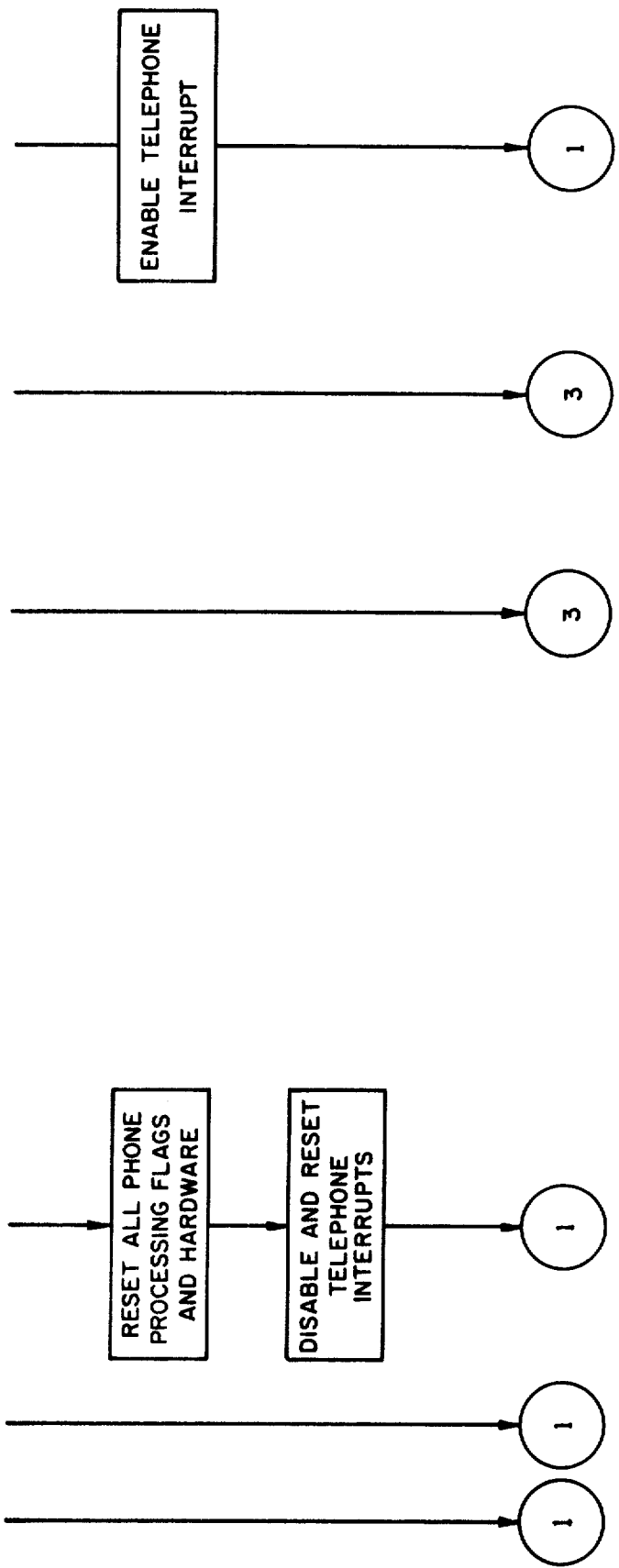

Subroutine 4, for transmitting data to the paralleled receiver/decoders of all of the multiplicity of load control processors, commences by checking a receiver/decoder transmitter counter for a zero state. If the transmitter counter is in the zero state, indicating that no further receiver decoders are to have data transmitted thereto, the subroutine resets the MAPFL flag and causes the media interface 40 to place the powersaver signal on data line 45 to place all of the load control processors in the powersaver mode. If the transmitter counter is at a count other than zero, a receiver/decoder pointer is set and a software data output buffer is loaded with the particular output data to be sent to a given receiver/decoder. The receiver/decoder address pointer is checked for overflow and the proper address is entered into the software buffer. The complete data word, having a format explained hereinbelow with respect to FIG. 13b, is transmitted from the software buffer, via I/O bus portion 15c, to the media interface 40 for transmission to the load control processors. After transmission of all receiver/decoder data words, the routine enters subroutine 2 (FIGS. 10D, 10E and 10F).

Subroutine 2 is entered if all map changes and all operations console interaction are terminated. The subroutine commences by checking whether a telephone service request (TLRQS) is present. If such service is requested, the type of service, either normal sector control or control of an individual relay, is in effect. If normal sector control, as determined by a telephone input code, is in effect, the routine exits to subroutine 3, hereinbelow discussed. If individual relay control is requested by the person on the telephone line, the individual relay control data transmitted by that user presently on the telephone line is sent to the receiver/decoder of the particular load control processor affected; the telephone line is then checked for further user input and if such input is present, the routine exits to subroutine 3; if no further input is forthcoming, a telephone timer is reset and the telephone interrupt program is reenabled prior to returning to the beginning of subroutine 1 of the system command executive.

In the event that TLRQS was not requested at the beginning of subroutine 2, the subroutine checks whether the telephone is presently ringing with a remote user request and if so, readies the telephone data set comprising telephone interface 37 and requires data therefrom. If no phone ringing is present, subroutine 2 continues to check the activity of the telephone line, the enablement of connection 38 between telephone line 39 and the interface 37 and further checks for time-out of the specific time interval allotted for any user on the telephone to complete his call. If the system has timed-out, if normal sector control was requested, or if the user is still on the telephone with further input past the time limit, the command executive program enters subroutine 3 whereby the telephone connection is broken and all telephone I/O and processing flags and interrupts are returned to their initial conditions, prior to reentering the system command executive at subroutine 1.

Referring now to FIG. 11a through 11h, a flow chart for the telephone interrupt service routine is shown, which routine is entered by initiation of a priority interrupt when the user dials the dedicated phone number allowing access to telephone interface 37. After the telephone has been answered by the central facility, a telephone priority interrupt is enabled. Thus, the central facility can continue to perform normal executive activity and be interrupted only when a telephone input is entered. Each time a telephone interrupt appears, the routine passes through the telephone director of FIG. 11a. This dispatches the input to the appropriate subroutine (0–4), depending on the position of the sequence of data received. The director (TLDIR) is initially set to 0 for the first input.

FIG. 11b corresponds to TLDIR equal to 0. In this section, the type of service is determined; TLSRV is either set to normal sector service or individual relay service determined if the first input is a numeric or a "#", respectively. Before returning to normal processing TLDIR is set to one for the next input.

Figure 11H:
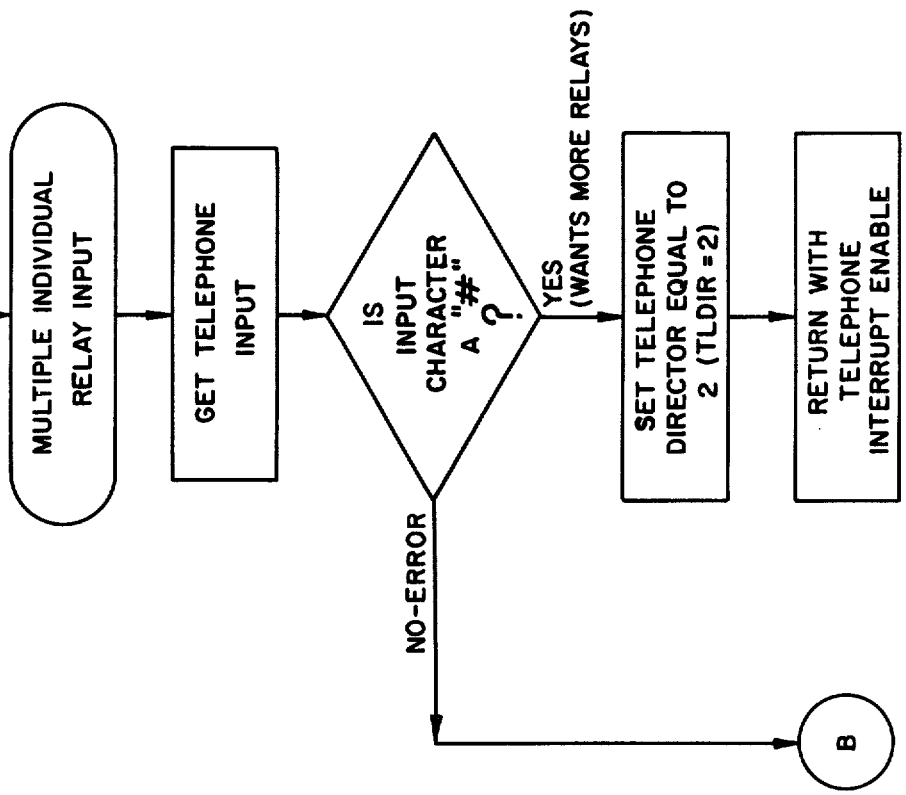
Figure 11A:
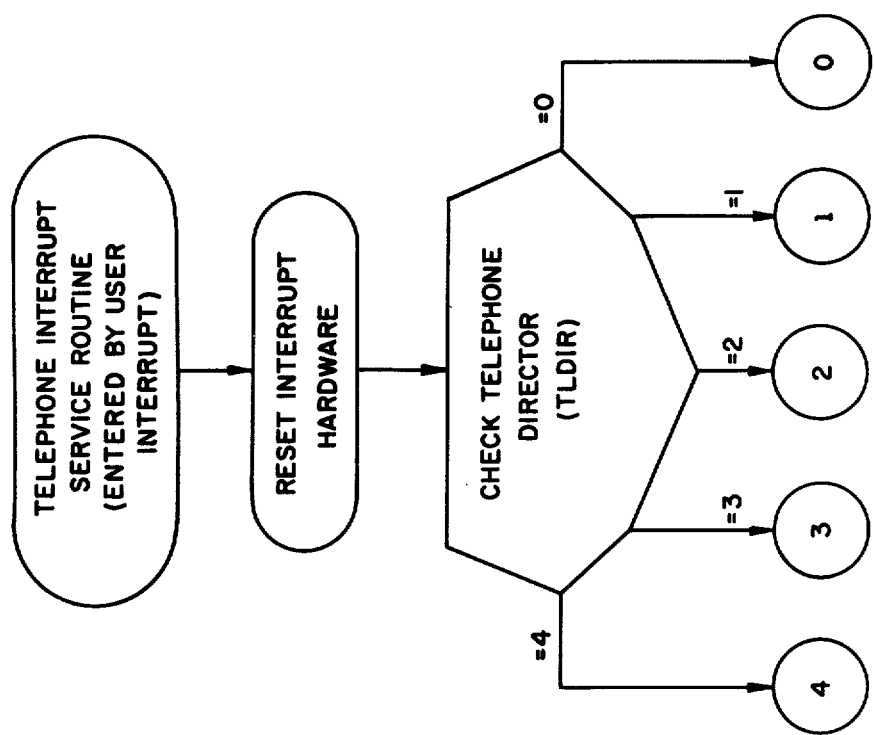
Figure 11C:
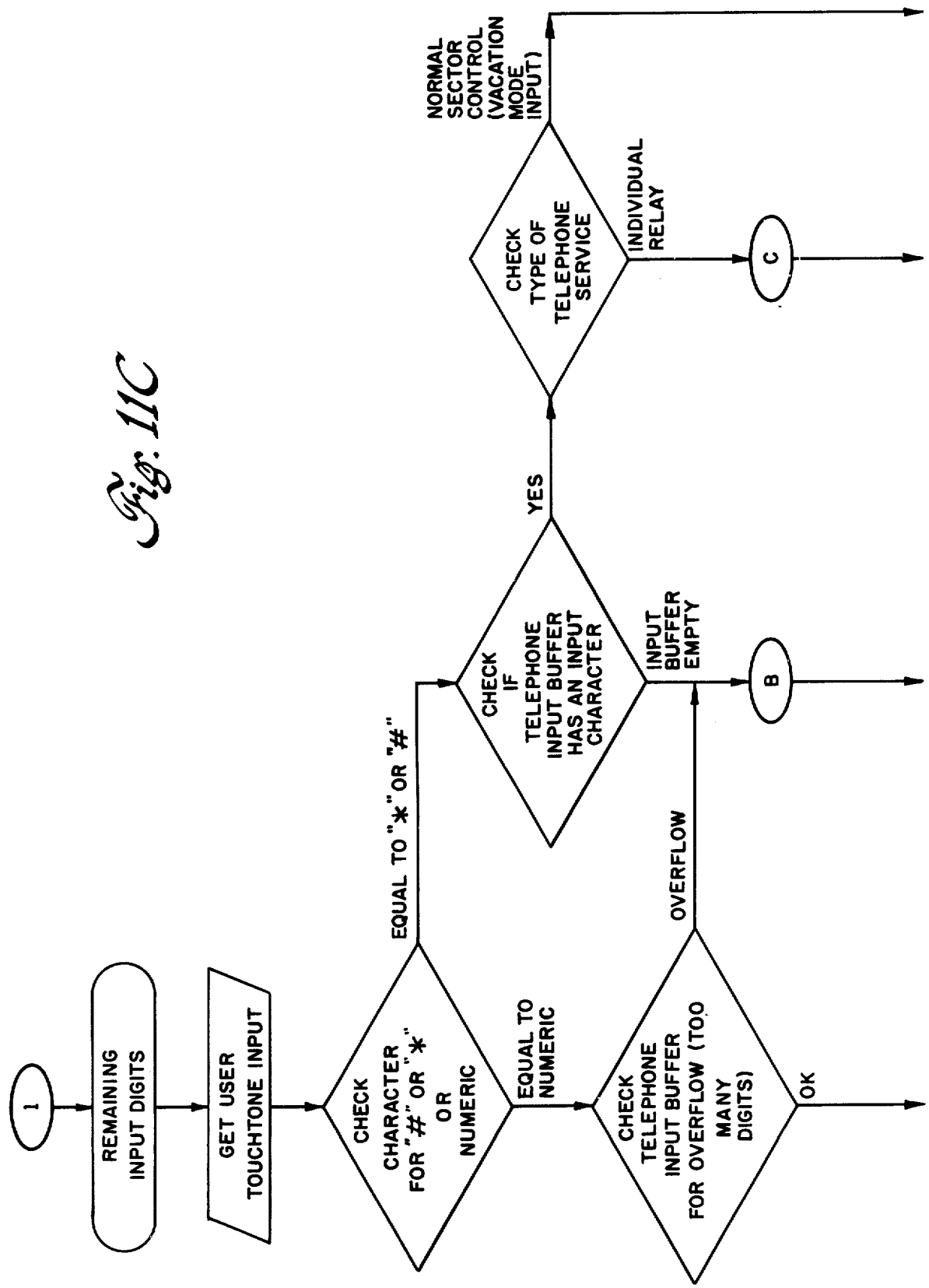
Figure 11D:
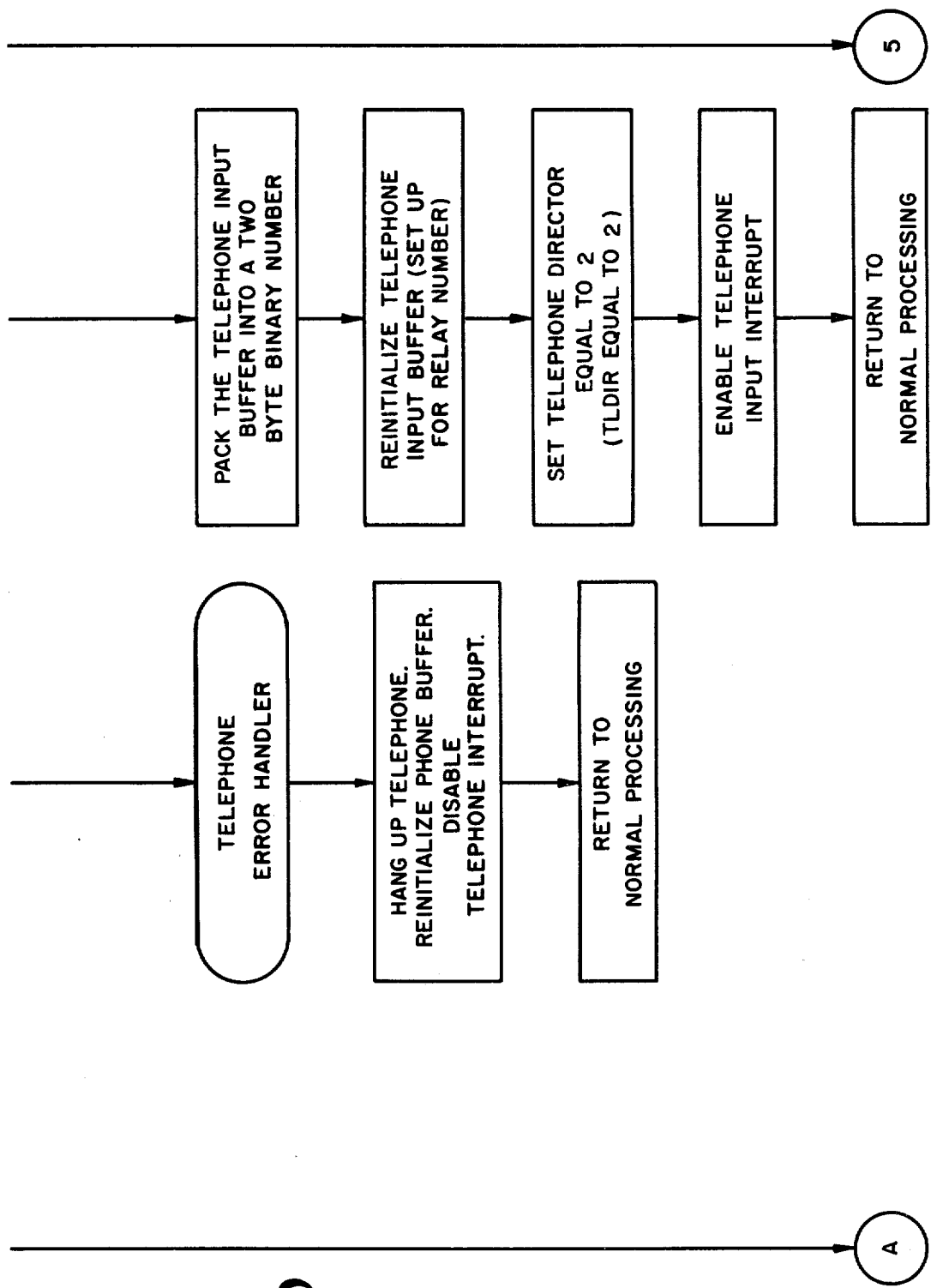

FIG. 11c corresponds to TLDIR equal to 1. This program sequence inputs telephone data and stores the data in order of entry by the remote user into a buffer in RAM memory. When a delimiter (# or *) is found, a check as to the type of service is determined before processing of the data in the buffer is undertaken. If type of service is individual relay, then the telephone input buffer is packed into a two-byte binary number, as shown in FIG. 11b, to be stored as the LCP number. The LTDIR is then set to 2 for the reception of the affected relay number. If type of service is normal sector control, processing continues as shown in FIG. 11i.

In FIG. 11i, it is first checked if the last telephone input was a "*" or a "#" to determine if sector level control or vacation override control, respectively, is requested. If vacation override control is requested, the sector level data word is forced to zero. The service request flag is then set (TLRQS) so that when control passes back to the main executive loop, telephone service will be undertaken in the normal activity flow, as shown in FIG. 10d. If a normal sector change is requested, then control passes to C of FIG. 11d. However, the packed binary number is taken as the sector number and TLDIR is set to 2 to setup for the input of the level information.

Figure 11E:
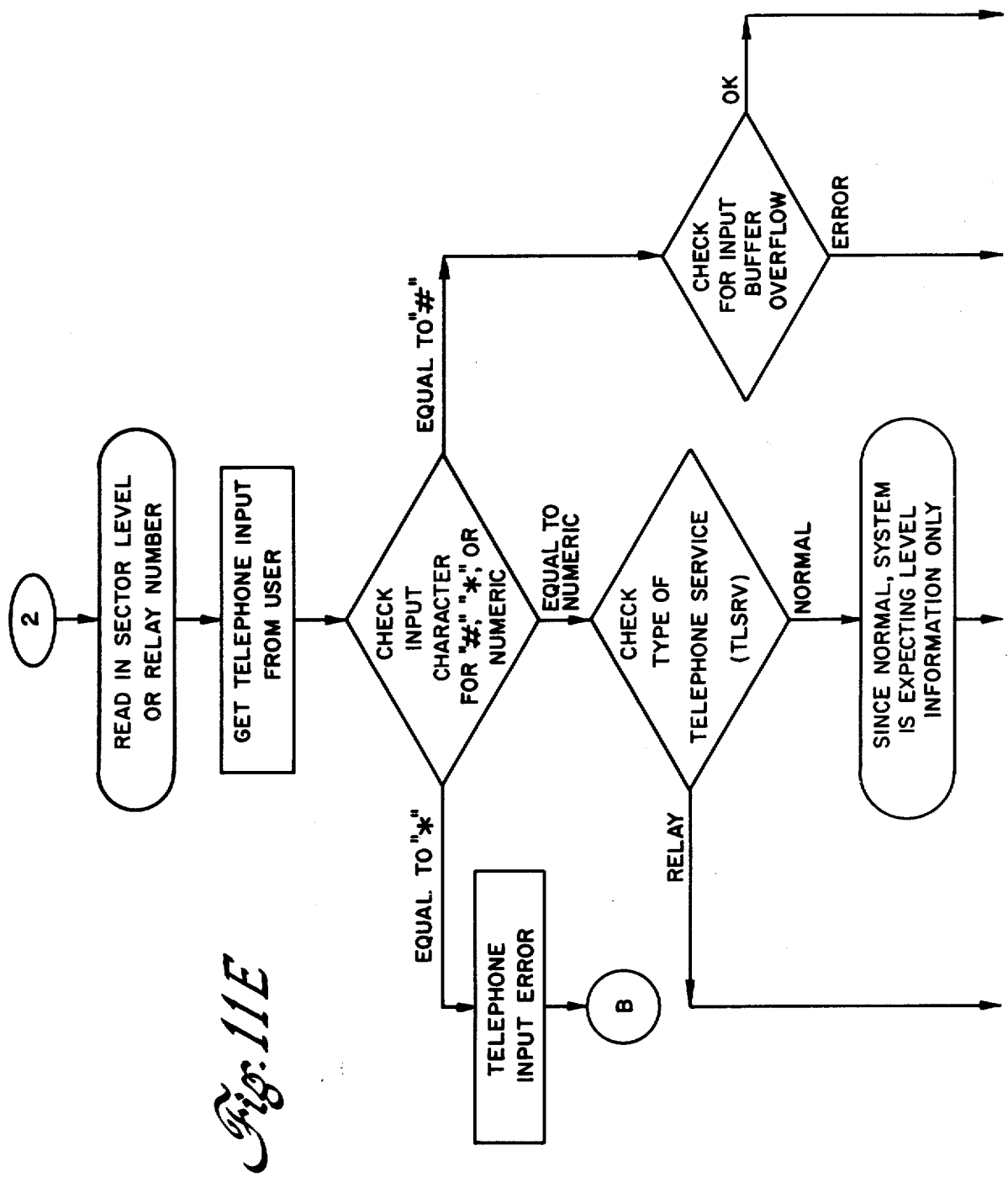
Figure 11F:
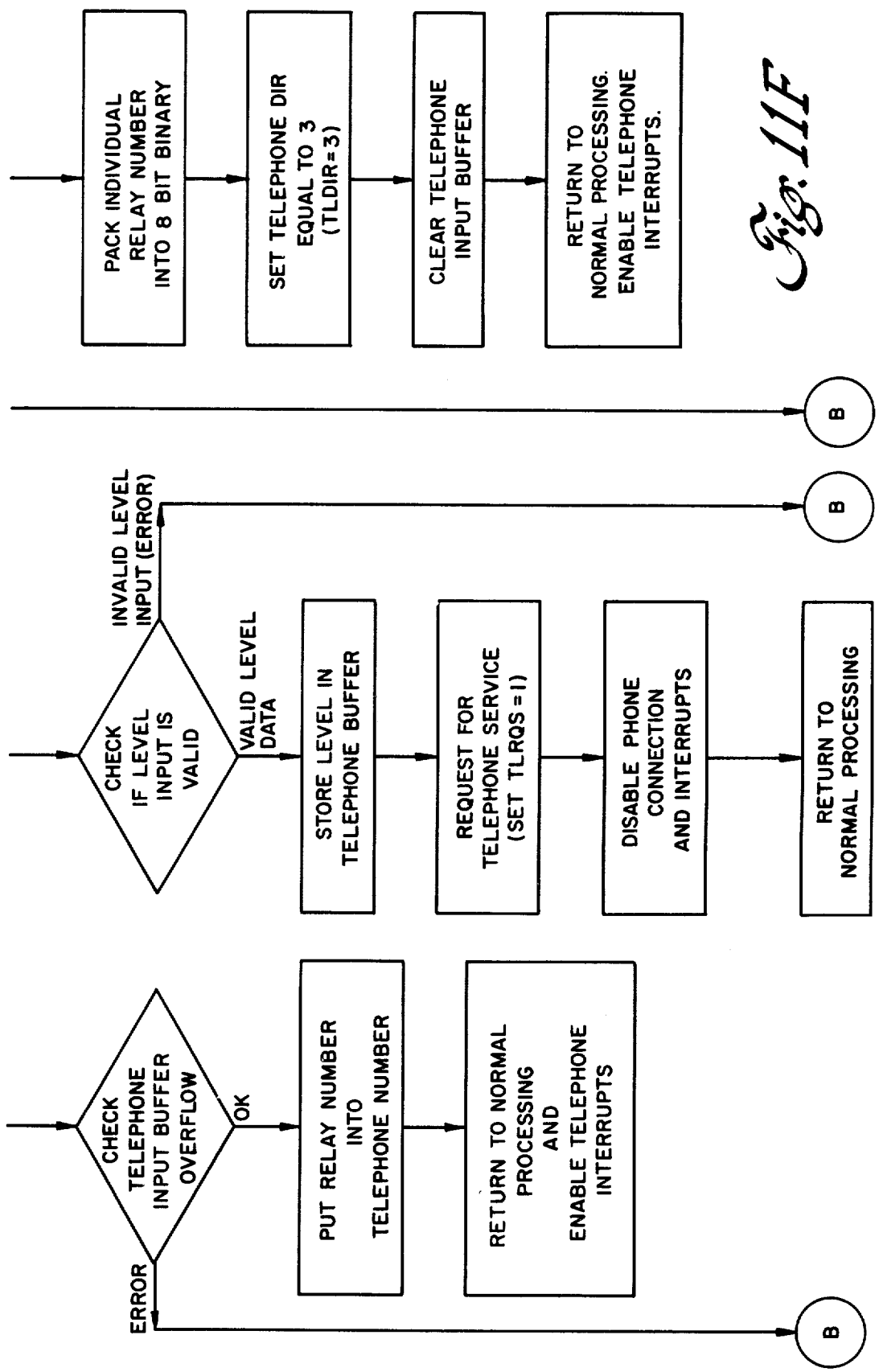

FIG. 11e corresponds to TLDIR=2. This program segment takes in either sector level information when in normal sector control or the relay number when in individual relay control. A check is made on the incoming data for errors. As shown in FIG. 11f, if the data is interpreted as a sector level, then the telephone service request flag is set, the phone connection is broken and processing returns to the main executive for telephone serviceing.

FIG. 11g corresponds to TLDIR=3. This program segment interprets the telephone data as being an individual relay level input. A check for errors is made on the input character. If the input is valid the telephone service request is set and the TLDIR is set to 4 for any additional relay change for the given LCP.

FIG. 11h corresponds to TLDIR=4 and determines if additional individual relay control inputs are requested. If so, TLDIR is set to 2; if not, the line is terminated.

In the event that power is removed, either intentionally or inadvertently, from the system, upon restoration of power thereto, the system automatically resets, clears all RAM memory locations and loads the system definitions from the memory storage media in mass data storage means 14, all without user intervention. The real-time clock, being backed up by a large-capacity battery means 29, will provide proper time information to the power-up/reset bootstrap routine of FIG. 12, to allow the system to install the proper map called for at that time and to do so in automatic fashion. The bootstrap routine, which is loaded into ROM memory 12b, is located starting at memory address $0000_H$ (see FIG. 3), which address is the initial address called upon restart by the particular CPU (the 8080) utilized in our preferred embodiment, whereby the bootstrap routine can initialize the CPU and reset all LCPs, as well as the operation of the console 35 and telephone interface 37. The bootstrap checks the mass data storage means 14, and if the magnetic tape contains the proper system software and map/sector/schedule information, the bootstrap loads this data, checking for errors, and if the data is successfully loaded, proceeds to the command executive routine (see FIG. 10) for execution thereof.

Figure 13A:
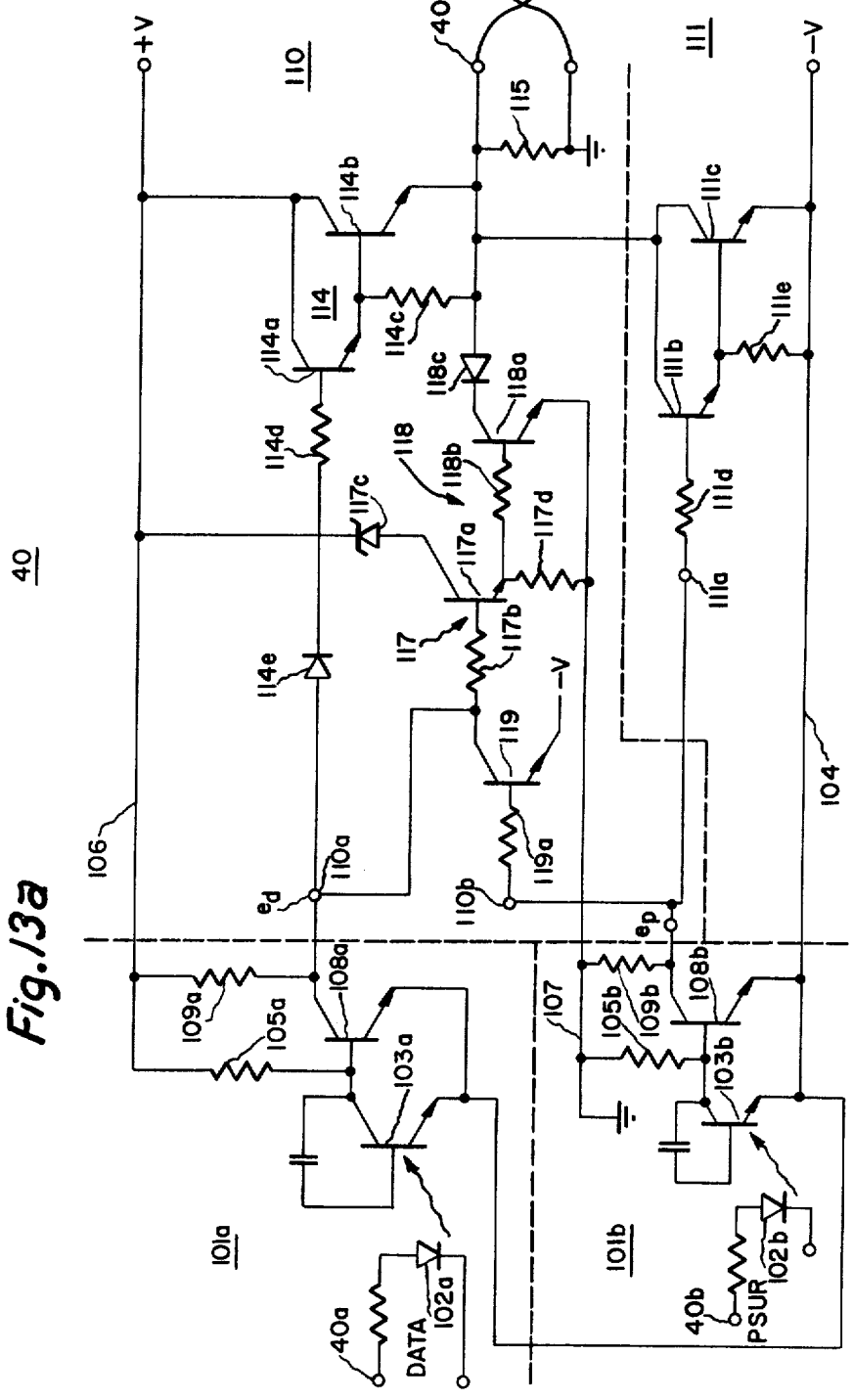
FIG. 13a is a schematic diagram of one embodiment of a media interface for use in the system.
Figure 13B:
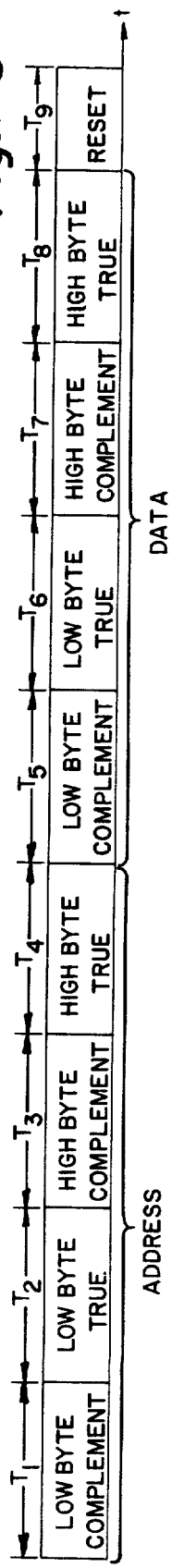
FIG. 13b is an illustration of the transmitted data format used in one embodiment of the system.

Referring now to FIG. 13a, media interface means 40 couples to the preferred twisted-pair media 45 both a data signal, having a binary one level of about +V volts and a binary zero level of about 0, or ground potential, volts as well as a power saver (PSVR) signal which is a negative voltage of about −V volts for the purpose of turning off a major part of each load control processor 50. Each of the data and power saver signals is received by an identical input section 101a or 101b, utilizing optical coupling techniques between a current-limited photodiode 102a or 102b and an associated phototransistor 103a and 103b. The emitters of both phototransistors 103 are coupled to the negative potential bus 104, while the collector of the first phototransistor 103a is coupled via a load resistor 105a to the positive voltage bus 106, and the collector of the second phototransistor 103b is coupled via another load resistor 105b to the ground bus 107. The collector of each phototransistor is coupled through a DC amplifier transistor 108a and 108b, respectively, with its associated load resistance 109a and 109b, respetively, to provide isolated and amplified data and powersaver signals $e_d$ and $e_p$, respectively, to the media data driving circuitry 110 and powersaver driving circuitry 111.

In the absence of a PSVR input, driving voltage $e_d$ is coupled to the input of the Darlington amplifier 114 coupled between the positive bus 106 and output resistor 115. The driving signal is also coupled via emitter follower 117, comprised of transistor 117a, base resistor 117b, Zener diode 117c and emitter resistor 117d to an output stage 118, comprised of a transistor 118a, its base resistor 118b and a collector diode 118c, with the collector diode-transistor collector-emitter circuit coupled across output load 115. A binary one (positive true) signal at input 110a causes Darlington amplifier 114 to saturate, while causing transistors 117a and 118a to enter the cut-off state, whereby the interface means output 40c is forced to a voltage approximating the +V potential, in logic one condition. When a data zero signal appears at data input 40a, a logic zero signal appears at amplifier input 110a, driving Darlington 114 to the cut-off state and allowing the voltage at output 40c to fall to approximately ground potential. The foregoing is true if the powersaver input 40b does not have a powersaver signal present, whereby the input voltage $e_p$ at both the powersaver amplifier input 111a and the data amplifier auxiliary input 110b is a binary zero level of approximately −V volts, cutting off the powersaver amplifier Darlington transistors 111b and 111c to prevent any interaction thereby with the data levels across output load 115. The large negative voltage at auxiliary data amplifier input 110b biases the associated transistor 119, via its base resistor 119a, into the cut-off condition, whereby transistor 119 does not affect the voltage at data amplifier input 110a.

When a powersaver signal is present at powersaver input 40b, the signal $e_p$ has a binary one voltage of approximately ground potential. This ground potential at powersaver amplifier input 111a causes saturation of the Darlington transistors 111b and 111c and pulls the interface means output 40c to the negative voltage −V. Simultaneously, transistor 119 is saturated, placing a negative voltage signal at data amplifier input 110a to place both the Darlington output circuit 114 and the pull-down transistor 118a in their respective cut-off conditions, removing all influence thereof on the voltage state of the output. Collector diode 118c is not utilized to prevent damage at the collector electrode of he reverse-biased transistor 118a. Thus, it is seen that the PSVR signal takes precedence over all data signals and prevents transmission of the latter over the system media 45.

Referring now to FIG. 13b, when data is present, data is transmitted to the receivers/decoders, of the individual load control processors, over the dedicated two-wire transmission link at a high data transfer rate of about 2400 bits per second, with a high noise immunity being achieved by utilizing; a complementary-redundant error-detecting code; a large voltage swing between the two logic levels transmitted; and threshold-crossing data recovery techniques at the receiving end. The data transmission format thus transmits the two-byte address code commencing with the low-order byte (as required by the particular data format of the 8080 microprocessor utilized in the illustrated embodiment) which low-order byte is first transmitted as 8 bits of complementary data in time interval $T_1$ and is followed by the eight bits of the low order address byte transmitted as true (or non-complemented) data in time interval $T_2$. The high order eight-bit address byte follows with the complement of the eight data bits being first transmitted in time interval $T_3$ and followed by the eight bits of the high order byte transmitted in data-true manner in the fourth time interval $T_4$. Thus, if the sixteen-bit address of a particular receiver/decoder to be addressed is $47AF_H$, or 0100011110101111 in binary, the transmitted address will be 01010000 in time interval $T_1$ (the complement of the low order byte), followed by the eight bit true low-order byte 10101111, in time interval $T_2$, followed by the high-order byte complement eight-bit pattern 10111000, in time interval $T_3$ and ending the address portion of the transmission with the high order byte data-true eight-bit pattern 01000111. The following two bytes of data are also transmitted with the low-byte in complementary form during time interval $T_5$ followed by the low-order byte in true-data form during time interval $T_6$, and then the high-order byte in complementary data form during interval $T_7$ with the true-data representation of the high order bit following time interval $T_8$. A framing error is transmitted during a time interval $T_9$ to act as a reset at the end of the address-data transmission.

Figure 13C:
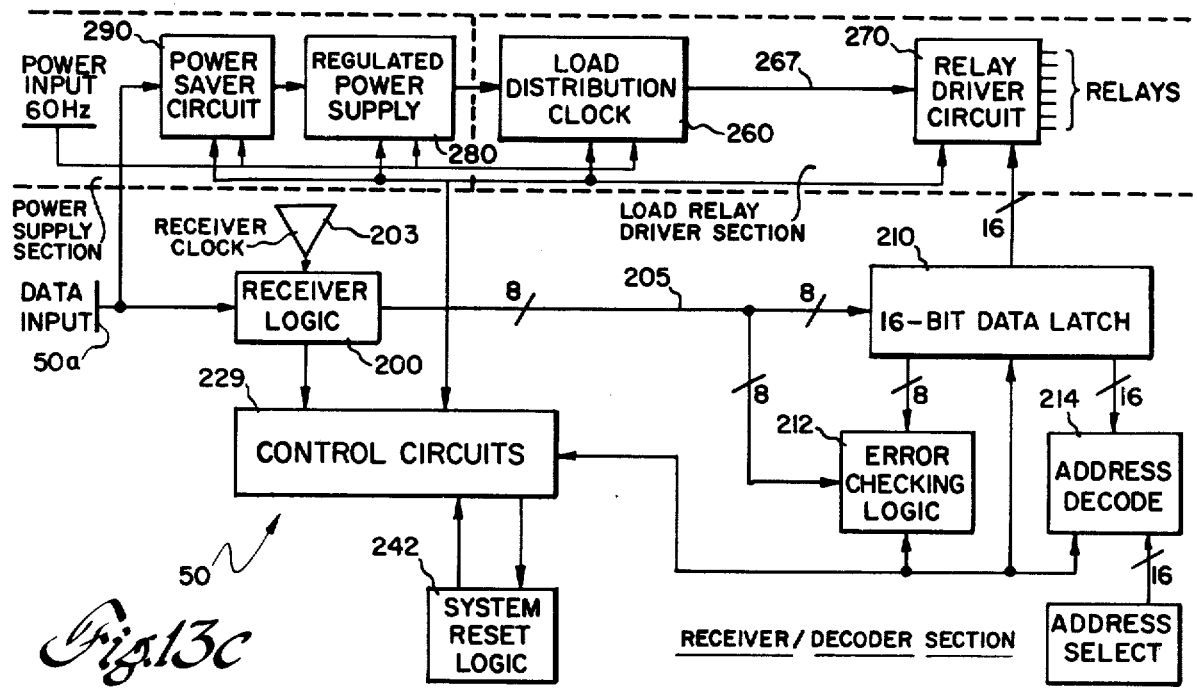
FIG. 13c is a block diagram of one embodiment of load control processor utilizable in the system of the present invention.
Figure 13D:
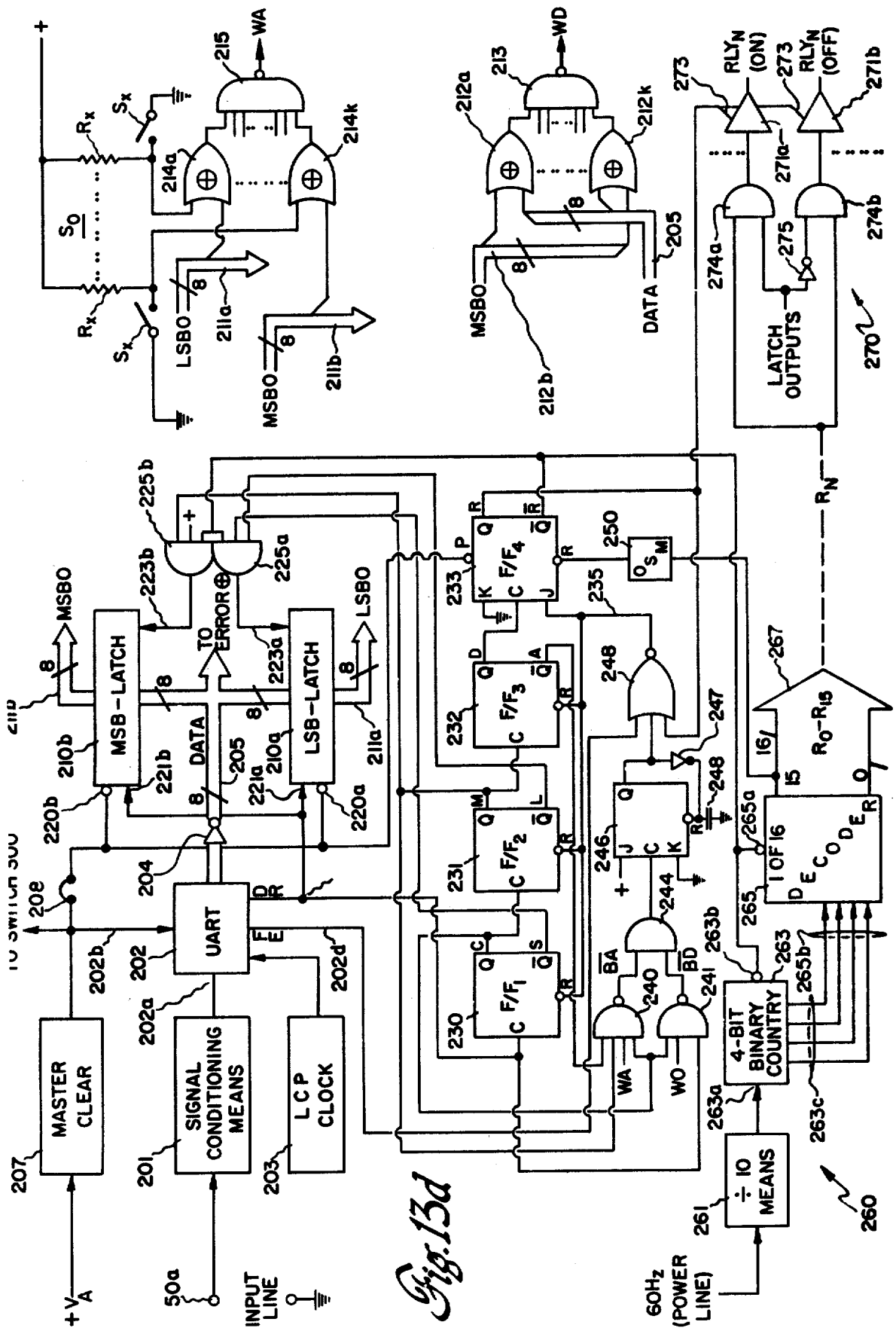
FIG. 13d is a circuit diagram of the receiver/decoder circuitry of the load control processor of FIG. 13c.

Referring now to FIGS. 13c and 13d, the data input from transmission media 45 is received at load control processor input 50a, and is coupled to receiver logic circuitry 200, preferably comprised of some signal conditioning means 201, including low pass filtering means for removing high frequency interference from the incoming signal and means, such as a Schmitt trigger and the like, for restoring sharp leading and trailing bit edges. The conditioned signal is coupled to a universal asynchronous receiver-transmitter (UART) 202 at the data input 202a thereof. A load control processor clock 203 is coupled to the clock input of the UART; the clock serves to establish the bit rate acceptable for reception by the UART. Signal transmission through media 45 and into UART 202 is in serial fashion. The UART, having been previously reset by the application of a reset signal at reset input 202b, coupled via master clear 207 to the potential energizing the entire receiver/decoder, receives the eight serial bits and simultaneously presents these eight bits, through a set of inverters 204, on an eight-bit-wide parallel data bus 205, when a data ready (DR) output 202b is enabled for a short time interval.

The data bus is coupled to a sixteen-bit wide data latch 210 comprised of a pair of eight-bit data latches 210a and 210b having their data inputs coupled in parallel to bus 205. The less significant byte of each of the address and data words are stored in the less significant byte (LSB) latch 210a while a more significant byte is stored in the remaining (MSB) latch 210b, when the respective data latch is properly controlled to the storage condition by control circuitry outputs to be described hereinbelow. The eight-bit wide data bus is also coupled to error checking logic exclusive-OR gates 212 in manner such that the data line assigned to the most significant bit is coupled to first exclusive-OR gate 212a and the remainder of the lines are coupled in sequential order to sequential exclusive-OR gates 212 until the data line assigned to the least significant bit is coupled to one input of the last exclusive-OR gate 212k. The remaining input of each exclusive-OR gate 212 is coupled to one associated bit on paralleled MSBO output bus 211b from the more significant byte latch 210b. The output of each of the exclusive —OR gates 212 is coupled to one input of a k-input NAND gate 213 to generate to wrong data (WD) signal, as required and hereinbelow explained.

Similarly, a plurality of exclusive-OR gates 214a-214K have one input terminal thereof coupled to one different output line from the LSBO and MSBO busses, with a remaining gate input coupled to one switch $S_x$ of a receiver/decoder address determination switch assembly $S_o$. The switch is coupled between the remaining gate input and ground, with a pull-up resistor $R_x$ being coupled between that gate input and a positive voltage. The outputs of all exclusive-OR gates 214 are coupled to an associated input of a k-input NAND gate 215 to generate a wrong address (WA) signal as described hereinbelow.

Each of latches 210a and 210b have a reset input 220a and 220b, respectively coupled to the reset output of the master clear circuitry 207, via a jumper 208 a first latch enable input 221a and 221b, respectively, is coupled to the data ready output 202c of the UART; and a second data-load input 223a and 223b, respectively, is each driven by the output of a three-input AND gate 225a and 225b, respectively.

Control circuitry 229 includes four flip-flops 230-233 used as a state-sequence counter; the clock input C of first flip-flop 230 is coupled to the data ready output 202c of the UART, with the clock input of each following flip-flop being coupled to the Q output of the preceding flip-flop. The J and K inputs of the first three flip-flops 230-232 are coupled to a positive potential (not shown for purposes of simplicity) while the K input of the last flip-flop 233 is coupled to ground potential and J input of flip-flop 233 is coupled to reset bus 235, which bus is also coupled to the reset inputs R of the preceding three flip-flops 230-232. The Q output of first flip-flop 230 is coupled to one input of each of a pair of NAND gates 240 and 241, while the $\overline{Q}$ output of flip-flop 230 is coupled to one input of AND gate 225a; the Q output of flip-flop 231 is coupled both to one input of AND gate 225b and to one input of NAND gate 240; the $\overline{Q}$ output of flip-flop 231 is coupled to one input of AND gate 225a; the $\overline{Q}$ output of flip-flop 232 is coupled to another input of AND gate 240, while the $\overline{Q}$ output of last flip-flop 233 is coupled to to an input of both AND gates 225a and 225b. The remaining input of AND gate 225 is coupled to a positive potential (logic one level).

NAND gates 240 and 241 form a portion of system reset logic circuits 242, in conjunction with AND gate 244, having an input thereof coupled to the output of each of NAND gates 240 and 241, and another J-K flip-flop 246, receiving its clock input from the output of gate 244 and having its J-input coupled to a positive potential and its K-input coupled to ground potential. The Q output of flip-flop 246 is coupled back to its reset R input via an inverter 247 and a time delay capacitor 248; the Q output is also coupled to one input of a three-input NOR gate 248, receiving the Q output of flip-flop 233 at another input and a framing error (FE) output of UART 202 at its remaining input. The output of NOR gate 248 generates the reset signal on line 235.

The reset R input of flip-flop 233 is formed by a one shot multivibrator (OSM) 250 acting on the output of load distribution clock means 260. The load distribution clock receives the 60 Hz. power line frequency and includes a divide-by-10 frequency divider 261 coupling its 6 Hz. output frequency to the input 263a of a four-bit binary counter 263. Counter 263 has its reset input 263b coupled to the $\overline{Q}$ output of flip-flop 233, along with the reset input 265a of a one-of-sixteen decoder 265. Each of the four outputs 263c of the binary counter are coupled to the corresponding one or four inputs 265b of the decoder. The sixteen individual decoder outputs $R_0$-$R_{15}$ are coupled via a sixteen-wide relay bus 267 to a set of sixteen relay driver circuits 270; the last decoder output $R_{15}$, i.e. the sixteenth bit, is coupled to OSM 250 to form the reset signal for flip-flop 233.

As previously explained hereinabove, each LCP is capable of operating sixteen relays, with two relays typically being required for a lighting fixture having both an "on-off" function and a "high-low" intensity function. Each of the relays is a latching type, being pulsed with current flow in a first direction to latch in a first condition and being pulsed with a current flow in another direction to latch in the remaining condition. The drivers for relay $R_N$, where $1 \leq N \leq 16$, comprised a pair of high-current buffers 271a and 271b, each having its output coupled to the particular relay N respectively for enabling the "on" and the "off" condition; and having a strobe input 273 coupled in parallel to the $\overline{Q}$ output of flip-flop 233. Each relay driver input is coupled to the output of an associated AND gate 274a and 274b, respectively, each having one input thereof coupled to a different single one of the sixteen relay output lines from decoder 265. The remaining input of the AND gate 274a associated with the "on" state, and the input of he remaining AND gate, coupled through an inverter 275, is coupled to the bit output of that one bit of the data latch 210 assigned to that particular relay. It should be understood that we prefer to transmit the first byte of data (fixture "on-off") information is inverted logic fashion and the last byte of data (fixture "hi-lo") information in non-inverted fashion, and place the relay driver inverters 275 for only the first 8 relays in the input circuit of gates 274a (with the inverters in the last 8 relay drivers being coupled as shown) for facilitating implementation of a "power-up-reset" mode hereinbelow described. It should be understood that while a single relay driver circuit 270, for a single relay, is shown in FIG. 13b, an additional fifteen such circuits are utilized for the remaining fifteen relays actuatable by the single load control processor of the present embodiment.

In operation, assuming a powersaver signal is not present on the data input line, the data sequence shown in FIG. 13b is received and conditioned by means 201 and is loaded into UART 202 in serial fashion. All of flip-flops 230-233 and 246 have previously been reset whereby the respective Q outputs are at a binary zero level. The first eight-bit-serial signal is loaded into UART 202 responsive to, and enabled by, timing pulses from the load control processor clock 204. The single byte signal is assembled and presented as an eight-bit parallel signal at the output of the UART; inverters 204 act to convert the complement data, initially received, to true-data placed on data bus 205 when the data ready (DR) output 202c is enabled. The DR signal enables both latch first inputs 221a and 221b, while the enabled $\overline{Q}$ outputs of flip-flops 230, 231, and 233 are combined in AND gate 225a to enable the LSB latch 210a second input 223a, to clock the eight bits of parallel data into the LSB latch and present the data at the latch output LSBO. The MSB latch second input 223 is also enabled as the second AND gate does not receive the Q output of flip-flop 231 at its input, but does receive a continuous logic enable (positive voltage) signal instead. The first DR signal appears at the clock input of flip-flop 230 and toggles the first flip-flop such that, after the first byte of information is loaded into the LSB latch 210a, flip-flop 230 has energized its Q output and de-energized its $\overline{Q}$ output.

The second (address low order true) byte of data is transmitted to the receiver decoder and loaded into UART 202 and then inverted by inverters 204 for presentation in parallel on data bus 205, simultaneous with enablement of DR output 202c. As the $\overline{Q}$ signal from flip-flop 230 is disabled, second LSB latch input 223a is disabled and the true data is not stored in latch 210a. The now-complemented data on data bus 205 is routed to exclusive-OR gates 212, whereby comparison is made with the now-true output of the MSBO bus 211a. If the complementary data on data bus 205 is the bit-for-bit complement of the true data now on MSBO bus 201b, the output of each exclusive-OR gate 212a-212k is enabled and the output of NAND gate 213 is disabled, indicating that proper first address byte data has been received. Conversely, if even one bit of either the complementary-data or the true-data word is improper, the WD output of gate 213 is enabled and is coupled to NAND gate 241, which gate has its remaining two inputs enabled by the presence of DR signal from the UART and the enablement of the Q output of flip-flop 230. In such case, the $\overline{BD}$ output of gate 241 is disabled and provides a falling clock pulse to flip-flop 244c which generates a reset pulse to NOR gate 248 coupled to the control logic reset line 235 to reset all flip flops and prevent the receiver/decoder from taking any action pursuant to the address-low-order-byte code having transmission errors associated therewith.

Assuming that the low order byte complementary-data and true-data transmissions have been error free, the output 211a of the LSB latch contain the address low-order-byte true -data code. The address high-order-byte is now transmitted with an eight-bit complementary code, which appears inverted and in parallel on data bus 205, simultaneous with the third enablement of the DR output 202c. The previous DR output had re-toggled flip-flop 230 such that the $\overline{Q}$ output was enabled, and had also toggled second flip-flop 231 such that its Q output was enabled (indicating that the more significant byte is to be operated on). The inputs of gate 225b being all enabled, the second gating input 223b of MSB latch 210b is enabled, such that the now-true data on bus 205 is loaded into MSB latch 210b at the third DR enablement. The address more-significant-byte true data is now present on MSB latch output bus 211 and one bit thereof is coupled to each of exclusive-OR gates 212. The third DR enablement also toggles flip-flop 230 such that the Q output thereof is again enabled. As at least one input of AND gate 225a is disabled, the data in LSB latch 220a is unaffected The high-order-address data-true byte is received at the UART and presented in inverted manner and in parallel on data bus 205. As both of gates 225a and 225b are disabled by the disablement of the $\overline{Q}$ output of flip-flop 230, this complementary-data byte is not leaded into either latch 210, but is coupled in bit-by-bit fashion to the remaining inputs of checking gates 212a-212k, where the bit-by-bit complementary nature of the true-data and complementary-data bytes are checked and a reset signal issued if the data bits are not full complements of each other, as previously explained hereinabove. If all data bits are correctly received, and no reset signal is present, the outputs 211a and 211b of the respective LSB latch and MSB latch, respectively, are routed bit-by-bit fashion to associated inputs of address-checking exclusive-OR gates 214a-214k. The remaining inputs of exclusive-OR gates 214 are either enabled or disabled by means of the pull-up resistors and grounding switches, previously set to encode the complement of unique address assigned to the particular load control processor receiver/decoder. The data on both latch output busses 211a and 211b are, as previously mentioned, in true-data form, which is exclusive-OR'd to the complementary-data address configuration of the switches and pull-up resistors and causes the outputs of each gate 214 to be enabled only if the corresponding bit of switch matrix complementary data is indeed the complement of the true-data established at the latch outputs. Therefore, gate 214 outputs are enabled and the output of NAND gate 215 is disabled, indicating a proper address. If one or more of gates 214a are disabled (indicating that at least one bit of the address data received is not the same as the corresponding bit of the preselected address) the output of gate 215 is enabled to signify that a wrong address (WA) has been received. The WA signal is received at NAND gate 240, having the remainder of its inputs enabled respectively by the Q output of flip-flop 230, the Q output of flip-flop 231 and the $\overline{Q}$ output of flip-flop 232. Thus, the output of gate 240 is disabled, indicating a bad address ($\overline{BA}$) condition, which causes the output of gate 244 to fall and toggles the reset flip-flop 246 to place a reset on control reset line 235 and effectively terminate action by the receiver/decoder.

The correct address having been received, and third flip-flop having had its Q output enabled by the fourth DR signal at UART output 202c, the receiver/decoder is now ready to receive the high and low order data bytes in successive complementary/true fashion. The low order complementary data byte is received, inverted and clocked into both LSB and MSB latches 210a and 210b in the same manner as the low order inverted-complementary address byte was stored in latch 210. Thence, the low order data-true byte is received, inverted and compared with the true data now available on the MSB latch output bus 211b, by the exclusive-OR gates 212 and gate 213. If the low-order data byte is properly received, the high order data byte complementary-data bits are next received, inverted and stored only in MSB latch 210b, and the high order data true-data bits are inverted and made available on bus 205, in the same manner that the low order address bytes were received, as hereinabove explained. The high order data byte complementary and true data bits are also compared in gates 212 and if no data transmission errors are detected, the operation of the receiver/decoder continues. If a data error is detected, the wrong data WD output of gate 213 is enabled, to disable the output of gate 241 and cause a reset to be generated on control logic reset line 234, preventing continued processing of the incorrect data received.

When a transmission is received containing the proper address previously assigned to the particular receiver-decoder, and containing two bytes of errorless data, the "data ready" signal associated with the data-true high order data byte transmission toggles all of flip-flops 230, 231 and 232 to disable the Q outputs thereof; the clock input of the fourth flip-flop 233 is thus toggled and brings the Q output thereof (the relay ready state) to its activated condition, to enable delay strobe line 273, as well as to enable the remaining input of NOR gate 248 to generate a reset signal on line 235 and reset the control logic preparatory to receipt of a next data transmission to the paralleled load control.

Receipt of a framing error during data-address transmission will cause the FE output 202d to be enabled to reset the control logic; the deliberate transmission of a synchronizing framing error signal at the end of the LCP address sequence, also causes FE output 202d to be enabled and reset the control logic preparatory to receipt of a next transmission. This is used to synchronize all of the LCPs with the central facility.

Latches 210 each now store a byte of data in true-data format. The relay clock circuitry 260, having been reset by the temporary disablement of the $\overline{Q}$ output of flip-flop 233, is now again enabled as flip-flop 233 is toggled responsive to receipt of the FE output generated by the reset portion of the data transmission. The four-bit binary counter 263 again counts through its count range and causes each one of the sixteen output lines of decoder 265 to be sequentially enabled, whereby each of the relay driver circuits 270 is sequentially enabled to set each of the sixteen relays either to the "on" or the "off" condition, dependent upon the state of the particular bit contained in the associated latch. As the relay data is present at the latch output in true-data form, inverter 275 is utilized in the "relay off" path between the latch output and the gating and driver associated with the relay "off" driver.

The above described LCP, and particularly the receiver/decoder section thereof, is configured to operate with a dedicated, separate data transmission medium and with a particular data encoding scheme. It should be understood that other transmission data media and encoding methods may be equally as well utilized; in particular, where the novel system of the present invention is to be retrofit in an existing building, devoid of the desirable twisted-wire-pair of coaxial cable media for data transmission to the LCPs, the existing power distribution wiring, for example, may be utilized. One receiver/decoder for such usage, although requiring a different data transmission method, is described and claimed in U.S. Pat. No. 4,091,361, issued May 23, 1978, assigned to the assignee of the present application, and incorporated herein by reference.

Figure 14:
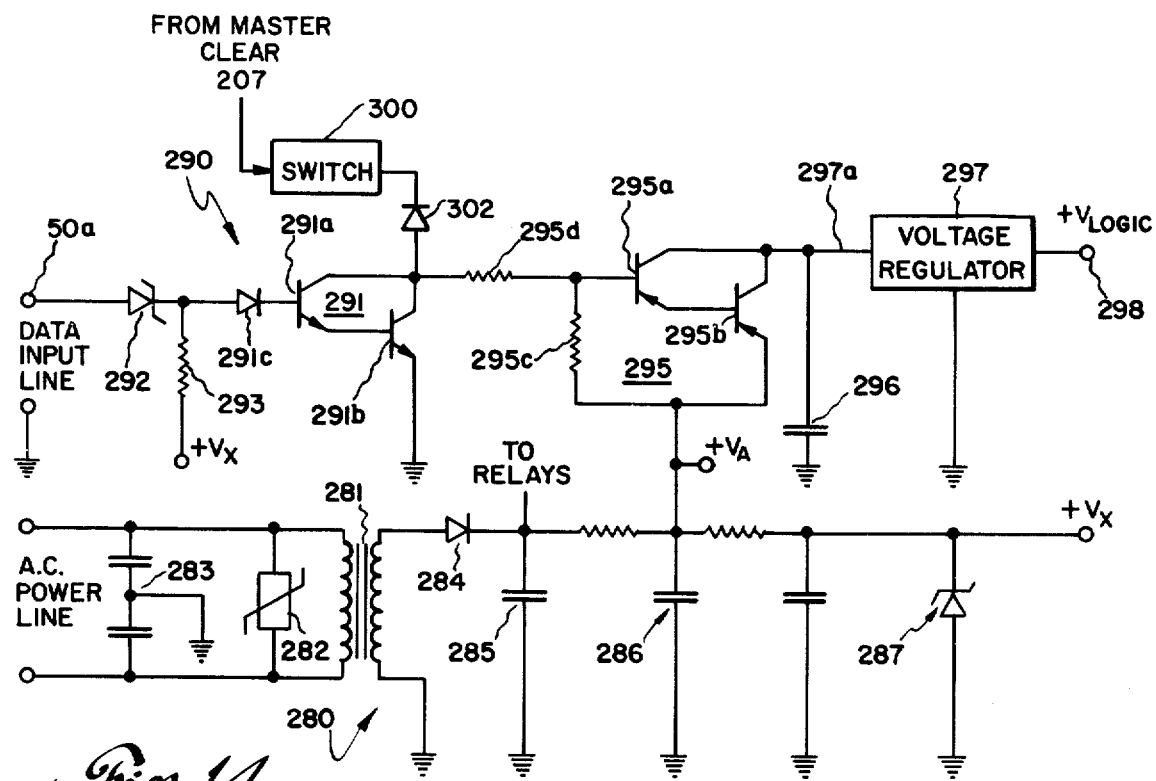
FIG. 14 is a schematic diagram of one embodiment of a powersaver-regulating power supply circuit utilizable in the load control processor of FIG. 13.

Referring now to FIGS. 13c and 14, the result of transmitting a PSVR signal to the paralleled receiver-decoders is considered. Each load control processor 50 includes a power supply circuit 280 coupled to the AC power line and including a power transformer 281 and transient suppression means 282 and noise suppression means 283 generally located across the primary of transformer 281. Coupled to the secondary of transformer 281 is a rectifier means 284 and a filter means 285, yielding some DC voltage at the junction therebetween for coupling to the relays and relay driver circuits 270. Additional filtering 286 and overvoltage protection means 287 are utilized to establish two additional DC voltages $V_A$ and $V_X$, of positive polarity in the illustrated embodiment.

The powersaver circuit 290 includes a Darlington amplifier 291, comprised of first and second Darlington transistors 291a and 291b, with a protection diode 291c having its cathode coupled to the base of transistor 291a. A Zener diode 292 has its anode coupled to data line input terminal 50a and its cathode coupled to the anode of signal diode 291c. A resistor 293 is coupled between the junction of diodes 291c and 292 and the $+V_X$ power supply output. A series-pass Darlington switch 295 includes Darlington pass transistors 295a and 295b coupled between the power supply $+V_A$ output and a filter capacitor 296, in parallel with the input terminal 297a of a voltage regulator 297. The power supply switch circuit 295 also includes a resistive biasing network comprised of resistors 295c and 295d, coupled between voltage $V_A$ and the output of the Darlington transistors 291. The output of the voltage regulator, at terminal 298 supplies the positive voltage necessary to operate the integrated circuits utilized to implement the logic of the LCP.

In operation, the data transmitted to LCP data input terminal 50a is of the positive-true type, i.e. a binary zero level generally corresponding to a voltage level of about zero volts and a binary-one logic level generally corresponding to some positive voltage level (typically on the order of +15 volts). During normal data transmission, it will be seen that the voltage at terminal 50a is never less than zero, whereby the voltage on the anode of signal diode 291c, and hence across the base-emitter junctions of Darlington transistors 291a and 291b, is always positive. Hence, the Darlington transistor base-emitter junctions are forward biased and the magnitude of resistor 293 is adjusted to place the Darlington pair in saturation, with the result that the end of resistor 295d furthest from transistor 295a, is substantially at ground potential. The resistive divider comprised of resistors 295c and 295d is chosen such that the Darlington switch transistors 295a and 295b are in saturation whereby substantially the full magnitude of voltage $V_A$ appears at the input 297a of the voltage regulator. The magnitude of voltage $V_A$ is chosen to be larger than the required logic voltage $V_{LOGIC}$, such that regulator 297 operates and the proper logic voltage is available at output terminal 298 to allow proper operation of the LCP.

The Zener voltage of diode 292 is chosen such that when the negative magnitude PSVR signal is received, the sum of that negative voltage plus the positive Zener voltage is such that a negative voltage still appears at the anode of signal diode 291c. The base-emitter junctions of both Darlington transistors 291a and 291b are reverse-biased and the transistors are then in the cut-off condition, placing each of the Darlington transistors 295a and 295b also in the cut-off condition, whereby current does not flow to the input 297a of the voltage regulator. The magnitude of the logic voltage at regulator output 298 falls substantially to zero, and not only prevents operation of the receiver/decoder but also prevents any substantial power consumption by the circuitry of the LCP. As previously explained hereinabove, the negative DC voltage level utilized for the powersaver function is removed to again provide a non-negative voltage at data input 50a and allow the receiver/decoder logic circuitry to be re-powered and readied for subsequent receipt of new data transmission.

Advantageously, the master clear circuitry 207 recognizes re-application of mains power after some finite time interval of absence thereof, with the time interval being set by means well known to the art, and, if jumper 208 is intact, applies the reset signal to a switch means 300, which may comprise another Darlington amplifier similar to Darlington 291. The output of switch means 300 is coupled to the output of switch 291 through a protection diode 302. Thus, when mains power is reestablished, any PSVR signal at LCP input 50a is effectively overriden by enablement of switch means 300 response to the master clear reset output, to cause saturation of Darlington switch 295 and provide for the operation potential of the LCP. The same reset output is coupled, via jumper 208, to the clear, or reset, inputs 220a and 220b, of respective latches 210a and 210b. The latch outputs are all reset to a binary zero state, while a preset input P of flip-flop 233 is enabled to establish energization of the Q output thereof (corresponding to relay cycling enablement). The load distribution clock 260 cycles the relay driver circuits 270. If the above-described repositioning of inverters 275, in the first 8 relay drivers, is accomplished, the latch outputs thereto are at a binary zero state and cause the fixtures to be in the "on" condition (due to the logic inversion prior to the relay-on driver 271a); the logic zero outputs of the remaining latch then cause the "hi-lo" drivers to be in the "low" lighting condition, whereby all fixtures are turned on after a power-outage, but are placed in a low lighting condition. The fixtures remain in this condition until the central facility has loaded the now-stored data from the mass data storage means (transferred thereto from RAM 12c responsive to the power outage) back to RAM and the proper time comparisons and map selection has been made. Once the map is selected, the CPU causes that may energy utilization pattern to be implemented and the overall low lighting condition is replaced by the proper lighting pattern for that time-of-day and day-of-week. Thus, even if mains power is temporarily removed, the system continues to function in manner such that some lighting is provided as soon as the power is restored.

If the "power-up reset" option is not desired, the jumper 208 is removed. Upon restoration of mains power, the relays (being of the latching type) remain in the same states as prior to the power outage and the prior energy utilization pattern is restored, until subsequently modified by the system's normal map-time-matching technique. Note that if the option is not to be used, the data bytes may both be transmitted in normal data-true fashion and the coupling of inverters 275 would then always be to the input of the "relay-off" AND gate 274b.

Referring now to FIG. 15, the real-time clock 20, allowing the energy load controller system of the present invention to implement a particular load energization map at a particular time, comprises an oscillator 300 having its frequency established by means of crystal element 21. The output of oscillator 300 is coupled to a frequency divider 302 which divides the crystal frequency, typically on the order of 32768 Hz., to produce one output pulse each minute, on line 303. The pulses on line 303 are coupled to the count C input of a minute counter 305, configured to count between zero and 59 and to reset to zero on the 60th pulse. The reset-to-zero in counter 305 generates a pulse on a line 307 coupled to the clock input C of an hour counter 308 configured to count from zero to 23 and to reset to zero on a 24th pulse received from line 307. The resetting to zero in hour counter 308 generates a pulse on another line 310, coupled to the count C input of a day counter 312, configured to count sequentially from one to seven and to reset to one on the eighth pulse. Thus, counters 305, 308 and 312 are configured to count the days, hours and minutes of a full seven day week. The data output lines 305a, 308a and 312a, respectively, of the minute, hour and day counters, respectively, are routed to the data inputs of an associated bidirectional bus driver 315, 316 and 317, respectively, which are INTEL 8212 bus drivers in our presently preferred embodiment. The outputs of each of bus drivers 315–317 are coupled to parallel data bus 12b. Data bus 12b is also coupled to parallel to the data inputs of a second set of bidirectional bus drivers 321, 322 and 323, each having its respective data output coupled to the pre-settable data inputs D of the associated minutes, hours and days counters 305, 308 and 312, respectively. Address bus 12c is coupled to an address decoder 325 configured to recognize three unique addresses respectively associated with the day, hour and minute functions; upon recognition of the previously selected addresses, one of address decoder outputs D, H or M is energized. Each of the address decoder outputs D, H and M are routed to a first data strobe input of both bi-directional bus drivers associated with that timekeeping function. Thus, the D address decoder output is routed to the first data strobe input 317a and 323a of the day timekeeping function I/O bus driver circuits; while the H address decoder output is coupled to both first data strobe inputs 322a and 316a of the hour bus drivers; and the M output of the address decoder is coupled to both first data strobe inputs 315a and 321a of the minute timekeeping function bus drivers.

The read control line 330 of control bus 12a is coupled to a second data strobe input 315b, 316b and 317b of each of the output bi-directional bus drivers 315–317, respectively. The write control line 331, from control bus 12a, is coupled to the second data strobe inputs 321b, 322b and 323b, of the remaining bus drivers, as well as being coupled to one input of each of a set of three two-input AND gates 334, 335 and 336. The remaining inputs of the AND gates are coupled to the associated output of address decoder 325; thus, the remaining input of gate 334 is coupled to the M output the remaining input of gate 335 is coupled to the H output and the remaining input of gate 336 is coupled to the D output of address decoder 325.

In operation, time data is loaded (written) into real time clock 20 by energizing the write control line 331 and transmitting the address, on address bus 12c, of the time data which is presented on data bus 12b. Address decoder 325 recognizes the proper address and energizes one of the day, hour or minute lines. The energization of write line 331 and one of the D, H or M lines enables one of AND gates 334, 335 or 336 and the associated preset enable (PE) input of the associated one of counters 305, 308 or 312. The data is removed from the data bus and entered into the appropriate bus driver by simultaneous energization of the first input thereof (facilitated by the energization of one of the three address decoder outputs coupled to the first data strobe input of each bus driver) and energization of the second data strobe input coupled to write line 331. The data is taken from the data bus and is transmitted through the appropriate input driver 321, 322 or 323, to the data D input of the appropriate counter. Presence of data at the D data input of the counter along with energization of the PE counter input causes the data to be loaded into the counter and the counter to count from that starting data. By sequentially placing the three sets of data on the data bus with presentation of the associated address on the address bus, the three counters of the real-time clock are loaded with the desired time data.

Time data is read out from the real-time clock by causing read line 330 to be energized and issuing the address of the desired timekeeping function; days, hours or minutes. Address decoder 325 recognizes the address and raises the appropriate output line, and enables one control input of one of bus drivers 315, 316 or 317. As read line 330 is also energized, the remaining control input is enabled and the proper day, hour or minute data output bus driver is caused to transmit data from the appropriate counter output 305a, 308a or 312a, respectively, onto data bus 12b for subsequent utilization by the CPU.

There has just been described a novel energy load controller system capable of being programmed to define each of several maps of energy utilization load programming in a plurality of sectors, each containing a plurality of controllable loads. Novel real-time clock and receiver/decoder circuitry useful in load control processors of this programmable energy load controller system have also been disclosed, as well as novel means of remotely actuating loads from a remote location using the telephone system.

Other novel features and advantages of the present invention will be apparent when reference is again made to FIG. 2 of the drawings wherein a floor plan of offices, corridors and rooms is shown. In actuality, the corridor and offices and rooms are described in terms of a floor plan, but the layout of the lighting fixtures in these areas is essentially comparable to a ceiling plan of lighting.

In the preferred embodiment described and illustrated herein, the lighting map is really a designation for the energy level of each of the lighting fixtures illustrated in FIG. 2 or in the larger facility of which the rooms, offices and corridor of FIG. 2 are a part. If eight different lighting maps are laid out, which can be identified as Map A through Map H, the operator of the system has a choice of installing any one of the eight maps in the system through the scheduling means which are described above. In other words, the schedule can be established so that the real time clock will call for a first Map A be installed at a certain time of day, while another Map B could be installed at a different time of day and yet another Map C could be installed at a still later time of day. But the installation of the maps according to the time of day alone assumes that all of the use or utilization of the facilities will remain fairly constant and that the environmental lighting conditions will remain essentially constant or at least will follow essentially the same daily schedule. However, if the outer solid line at the upper, left-hand and lower surfaces of FIG. 2 are considered to be outside walls and these walls are provided with windows, then it will be apparent that depending on the position of the sun, the time of the day, the clear or overcast nature of the sky, the amount of light entering the windows will vary. It is entirely within the purview of this invention to provide additional maps which accommodate the increase or decrease of light through the windows at the outer wall of the building. For example, all of the lighting fixtures at the outer wall of Room No. 2, that is $F_1$-$F_4$ of $L_3$, can be set at either half ("low") light when there is a moderate level of light entering Room 2 from windows on its outer wall or, alternatively, these fixtures can be fully shut "off" when there is a high level of light entering the windows at the outer wall of Room No. 2.

Similarly, the lighting fixtures at the perimenter of Office No. 1 and adjacent the outer wall, can be adjusted to be either half-off ("low") or full-off ("off") depending on the level of light entering through the windows of the outer wall. A fourth Map D might be provided to have each of the lighting fixtures at the outer wall at a half level of light and yet another Map E can be provided to have each of the fixtures at the outer wall shut off. One of the unique features of the control mechanism of the present invention is that once the maps are provided, they can be initiated by a number of alternative means and can also be initiated in parts rather than in their entirety. It should be understood that a map, such as fourth Map D, is really a predetermined condition for each of the lighting fixtures of all of the fixtures within a particular facility or a mapped area within the facility.

In one preferred embodiment of the invention described above, the energy utilization patterns may be established independently of any sectors which are established within the mapped area. However, a part of the novelty of the control system and mechanism of the present invention is that one pattern can be in force in one sector of the facility while a different pattern can be in force in another sector, adjacent or remote from the first area, of the same facility or in another facility. For example, if Room No. 2 constitutes one sector in the facility and Office No. 1 constitutes another sector of the facility, a sector pattern from Map D can be put into effect in Room No. 2 and a sector pattern from Map E, or any other map, can be put into effect in Office No. 1. As in example, this might be done because there is more outer wall space and, accordingly, more potential window space in Office No. 1 than there is in Room No. 2. Accordingly, Office No. 1 would receive more light through the windows of Office No. 1 than Room No. 2 would receive from the windows of Room No. 2. Thus, Office No. 1 might have a map which has all of the perimeter lighting fixtures including $F_1$-$F_5$ of $L_1$ plus $F_1$ and $F_4$ of $L_2$ in the full "off" condition pursuant to Map E. By contrast, Room No. 2 might have the perimeter fixtures $F_1$-$F_4$ of $L_3$ in the half-off ("low") condition pursuant to application of Map D to Room No. 2. As explained above, the way in which an energization pattern or a map is put in force in a sector is by employing the telephone interrupt to address a particular sector and then once the sector is addressed to install a specifically selected map pattern in that sector. The applicable portion of each of maps A through H can be installed in a particular sector, such as in Room No. 2, even though an entirely different map is installed in an adjoining sector, such as in Office No. 1. Accordingly, it is possible for the occupant of Office No. 1 to make contact with the central facility through a tone-coded telephone instrument and to call into operation within Office No. 1 a particular map pattern which suits the lighting needs of Office No. 1. Independently, the occupant or occupants of Office No. 2 can contact the central facility through a tone-coded telephone instrument and a call into effect in Office No. 2 the lighting map pattern which is particularly suited for Office No. 2.

Considering next an arrangement of lighting within Office No. 2, which may be, for example, an executive office in which there is a desk for desk work of the executive occupant of the office and also a conference table for holding conferences within the same office. The desk area may be in the left hand side of the room within the lighting area of $L_6$ and the conference area may be in the right hand side of the room within the lighting area of $L_7$. It will be apparent that the lighting requirements in the office will change from time to time depending on whether a conference is in session within the office or whether the executive is at work at his desk. The lighting needs within the office may vary considerably, as additional light may also enter the office through the windows in the external walls on two sides of the office. The change in lighting output of the lighting fixtures based on the change in the entry of light through the windows can be carried out in accordance with the scheme described above with reference to Room No. 2 and Office No. 1. However, in addition to those changes in the lighting within the office, responsive to changes in the ambient light entering the office through windows, the lighting need and use within the office will also change responsive to the areas of the office which are then in use. A portion of Map E might be the proper sector map pattern needed to establish the proper lighting in the left hand side of the office where the desk is located, when the desk is in use, and may be established to additionally cause the light in the right hand side of the office, where the conference table is located, to be energized to a "low" or partially "low" and partially "off" condition. Conversely, when the conference area, on the right hand side, of the office is in use, portions of another map, e.g. F, can be put into effect in the office to provide adequate lighting in the lighting fixtures of lighting control $L_7$ and the lighting fixtures of lighting control $L_6$ can be energized to "low" level or turned "off" because the desk area was not in use. Again, once these maps are established, the occupant or occupants of the office can access the central facility through the telephone and install Map E, F or G, or one of the other of a number of maps which can be established for the office, depending on the various lighting needs and the ambient lighting conditions of the office at different times. It will also be understood that the addressing of a sector constituting Office No. 2 can be done through the telephone interface completely independently of whatever lighting instructions are given to the central facility for Office No. 1 and Room No. 2, as discussed hereinabove.

It will be understood that Maps A through H, or Maps $M_1$ through $M_n$ (where n is some integer greater than one), are not established for a sector only but are established for all of the lighting fixtures within a map area. Thus, a Map M1 would include a lighting condition for each fixture of FIG. 2 and in fact of all fixtures of a mapped area of which FIG. 2 is a part. Further, it will be understood that the map, once established, will remain in effect for all lighting fixtures whether or not the whole map or any part of the map is used. Use of a full map occurs when it is installed in all of the fixtures of a lighting system, such as those illustrated in FIG. 2, in accordance with a schedule for map installation as described hereinabove. A partial use of a map occurs when a first map, such as Map C, is scheduled to be in effect, but the occupants of a particular sector use the telephone interface 37 to install a different map in their sector. In fact, a change in the map in effect in a particular sector can be changed by a person in another sector. For example, if the secretary of the executive from Office No. 2 is located in Room No. 2, she can access microcomputer 12 through telephone interface 37 from a telephone in Room No. 2 and adjust the lighting in Office No. 2 by changing the map in effect in that office or she can simply turn off all lights in Office No. 2 by proper tone instructions once the Office No. 2 sector has been addressed through telephone interface 37.

As another illustration, with reference to Office No. 3, if this office has a number of desks, as for example, in the corners under the lighting fixtures $F_1$, $F_3$, $F_6$ and $F_8$, then a number of different maps can be provided for the lighting of this office depending on the presence or absence of persons at the various desks in the corners of the office. Thus, Map A might provide light at a full ("high") level from fixture $F_1$ and low level light from fixture $F_4$ with all the other light fixtures being in the "off" condition. A second map might provide full ("high") light at $F_1$ and $F_3$, half ("low") light at $F_2$ and $F_4$ and place the other fixtures in the "off" condition. A third map might provide full light at $F_1$, $F_3$ and $F_6$ and half light at $F_2$ and $F_7$, if three of the four desks of the office were occupied. Obviously, other combinations of high, intermediate and off energy utilization conditions can be provided for the lighting fixtures in Office No. 3. If Office No. 3 is one of the sectors defined in the overall lighting system, then any of the occupants of the office can address the central facility 11 through telephone interface 37 and put into effect the lighting map within the sector of Office No. 3 which is appropriate for the use then being made of that office at the time. In addition, there is the factor of the change in the ambient light entering the office through the exterior wall windows and additional maps which provide for adjustment of the lighting within the sector of Office No. 3 can be defined pursuant to the scheme described above so that the most appropriate lighting will be in effect depending on the ambient source of lighting and the occupants of the office and the work they are doing.

Another facet of the control system provided pursuant to the invention as described above is that once a sector has been addressed through telephone interface 37, there are three elementary commands which can be addressed to all of the lights within that sector independently of any map. The three commands are all lights "high", all lights "low" and all lights "off". Accordingly, if the sector defined as Room No. 2 is addressed by tone-coded telephone and a command is given to put all lights to the "low" condition, then all lights in the addressed sector will be put to the "low" condition independently of any map which may be pertinent to the sector of Room No. 2.

Another unique feature of the control system of this invention is that each sector can be identified and defined, and once a sector is so defined, can be addressed via telephone interface 37. In one preferred mode of the present invention, the primary purpose of the sectors is to permit addressing a particular group of lighting fixtures by a direct switching mechanism. In the preferred illustration given, the tone-coded telephone is the switching mechanism which is described. However, it will be understood that other switching mechanisms may be employed in controlling the lighting within a sector. For example, in relatively smaller mapped areas of a building, a conventional card-reader mechanism can be employed in establishing schedules as well as in establishing maps to be set in place by the established schedule and further in defining sectors and in controlling those sectors to impose different maps into different sectors. The imposition of a map in a particular sector would, of course, be out of the normal map sequence inasmuch that, if the map of the established sequence is the one which is desired, there is no need to override the scheduled map to impose a different map in a particular sector or sectors based on conditions or activities within that sector.

Also as explained more fully hereinabove, if a particular map is in effect in a sector (whether this map is the established scheduled map to be in place for that sector or is a different map) there can be certain desirable lighting arrangements for a particular temporary use or condition of the area within the sector. If minor change in the existing lighting map is desired, it is also feasible, as is explained more fully hereinabove, to directly address a particular lighting fixture or fixtures within the area and to modify the lighting of the individual lighting fixture(s). Such modification is intended for temporary adjustment of lighting. Such telephone addressing of an individual fixture will override the scheduled map in effect or a prior temporary map imposed by addressing the sector. Normally, pursuant to the preferred embodiment of the invention described above, the override of an individual lighting fixture will remain in effect only during the remainder of the day on which the override was imposed. On the followin day, the normal scheduled maps will go into effect.

Accordingly, if it is desired to make a change in the lighting of an individual fixture or fixtures over an extended period, the manner in which this is accomplished pursuant to the present invention is by changing the assigned energization of that particular fixture or fixtures in one or more of the several maps which establish the energization level of each of the fixtures within the mapped area, including the fixtures within any smaller areas defined as sectors.

One of the advantages of the present invention illustrated by the description above is that the lighting can be modified from time to time during the eay, for example within a particular office, to meet the optimum need for efficient lighting during the period in which the premises is in use. For example, if someone is working in Office No. 2 late in the day, the lighting within the office can be independently controlled through telephone interface 37 although according to the scheduled map all light fixtures in the office would be off. The lighting within the office can be made fully adequate in the area of the executive desk in the office and "low" or "off" in other areas of the office. This will be so even though all of the lights in Room No. 2, Office No. 1, Room No. 1 and Office No. 3 are either at a very minimal level for security purposes or are entirely off. For example, the lights of fixtures $F_6$ and $F_7$ of $L_6$ can be left full on and the lights $F_5$, $F_2$, $F_3$, and $F_8$ and $L_6$ can be left half on with the lights $F_1$ and $F_4$ completely off. Further, in $L_7$, $F_1$, $F_4$ and $F_6$-$F_8$ can be left completely off; $F_2$, $F_3$ and $F_5$ can be left half-on (with $F_5$ being left half on for easy access to the door). Such an after-hour executive office work map can be established as one of the maps stored in the mass data storage means 14 and can be called into effect by the subject control scheme described above.

While one presently preferred embodiment of the present invention has been disclosed herein, various modifications and variations will now become apparent to those skilled in the art. It is our intent, therefore, to be limited only by the appending claims and not by the specifics of the single embodiment presented herein.

What is claimed is:

1. A system for programmably controlling the energy utilization condition of a multiplicity of loads, comprising:

a plurality of load control processors, each associated with at least one of said loads and adapted to enable the associated loads individually to a desired one of a plurality of energy utilization conditions, each load control processor having a unique address assigned thereto;

a central facility including memory means for storing data defining each of a plurality of sectors, each sector including at least one different one of said multiplicity of loads, said memory means also for storing data for at least one map defining the energy utilization conditions of a plurality of loads during a particular time interval;

a real-time clock;

central processing unit (CPU) means for addressing said real-time clock to receive time data for comparison against the particular time interval associated with each map stored in said memory means, said CPU means selecting that one of said maps to be currently enabled responsive to a favorable comparison of the time data and the map time interval; and first means for transmitting data from said central facility to said plurality of load control processors;

said CPU means controlling said first means to sequentially transmit the unique address of a plurality of load control processors and data for causing each addressed load control processor to implement the energy utilization condition of loads coupled thereto in accordance with that one of said maps then required to be enabled responsive to the favorable time comparison.

2. A system as set forth in claim 1, wherein the majority of sectors are at locations remote from said central facility.

3. A system as set forth in claim 2, further comprising means located adjacent to at least some of the remotely located sectors for communicating with said central facility to at least temporarily change the energy utilization condition of at least one load in at least one of said sectors.

4. A system as set forth in claim 3, wherein a telephone line capable of being accessed from remote locations in the vicinity of said sectors; and further comprising means at said central facility for receiving requests upon said telephone line and for coupling data contained in said request to said CPU and memory means for temporary enablement of changes in the energy utilization condition of at least one of load in at least one sector.

5. A system as set forth in claim 1, further comprising means for accessing said memory means to allow change of at least a portion of the data stored therein.

6. A system as set forth in claim 1, further comprising mass data storage means coupled to said memory means for storing the data in said memory means in nonvolatile manner when power is removed from said central facility.

7. A system as set forth in claim 1, wherein said real-time clock normally receives operating power from power mains, said real-time clock including means for enabling the timekeeping function thereof to continue in accurate and unabated manner if the power means are disabled.

8. A system as set forth in claim 7, wherein said memory means contains data causing said CPU to interrogate said real-time clock upon restoration of mains power, said CPU comparing the time data received from said real-time clock with each of the map time intervals stored within said memory means and transmitting data to said load control processors to implement the energy utilization conditions of all of said loads required by the map then required to be in effect when the mains power is restored.

9. A system as set forth in claim 1, wherein said first means includes means for controlling all of said load control processors to a condition of minimum power usage when data transmission is completed to said load control processors.

10. A system as set forth in claim 1, wherein the loads are lighting fixtures.

11. A system as set forth in claim 1, wherein said system normally receives operating power from power mains; said system further including means in each load control processor for causing a preselected pattern of energization of the loads coupled thereto after restoration of mains power following a mains power outage.

12. The system of claim 1 wherein at least one load is assignable to each of a plurality of different sectors.

13. A method for controlling the energy utilization condition of a multiplicity of loads, comprising the steps of:
providing a plurality of load control processors;
coupling each load control processor to at least one of the loads for enablement of the associated loads individually to a desired one of a plurality of energy utilization conditions;
assigning each load control processor a unique address;
providing memory means for storing data at a central facility;
storing data defining each of a plurality of sectors with each sector encompassing at least one different one of said multiplicity of said loads and the load control processors associated therewith;
storing data for at least one map defining, during a particular time interval, the energy utilization condition of loads of said multiplicity;
providing data indicative of the present time;
comparing the present time data to the data defining each time interval during which an associated map is to be enabled;
selecting the proper one of said maps to be implemented at the present time;
sending data to load control processors representative of the energy utilization state of loads coupled thereto in accordance with that one of said maps to be in effect at the present time; and
enabling the loads associated with each load control processor in accordance with the data transmitted thereto.

14. A method as set forth in claim 13, further including the step of locating the memory means at a location generally central to the now-remotely-located load control processors.

15. A method as set forth in claim 13, further comprising the steps of:
coupling a telephone line from the vicinity of at least one remote sector to the central locaton;
transmitting data from the vicinity of at least one sector to the central location via the telephone line;
accessing sector data stored in said memory means in accordance with the transmitted data;
identifying the load control processors to receive data enabling modified energy utilization conditions for the load associated therewith, in accordance with the sector identification data transmitted on said telephone line;
transmitting the accessed data from said central location to the load control processors for storage therein; and
modifying the energy utilization conditions of the loads coupled to the load control processors.

16. A method as set forth in claim 13, wherein the loads are lighting fixtures.

17. A method as set forth in claim 16, wherein the data sending step comprises the steps of:
assigning a first binary logic state to a data bit associated with a lighting fixture to be controlled to an energized condition; assigning a remaining binary logic state to a data bit associated with a lighting fixture to be controlled to a deenergized condition; assembling the binary data into a binary data word; and transmitting the binary data word to the addressed load control processor.

18. A method as set forth in claim 13, further comprising the steps of:
providing mass data storage means; and
transfering all data in said memory means to said mass data storge means upon the occurrence of a previously selected condition.

19. A method as set forth in claim 18, further including the step of providing means for continuously enabling the time-keeping function, even if the previously selected condition occurs.

20. A method as set forth in claim 13, further comprising the step of disabling all of the load control processors, to reduce the power consumption thereof, when the data transfering step is completed.

21. A method as set forth in claim 13, further comprising the steps of: powering all of the load control processors from power mains; and establishing a preselected load energy utilization pattern for the loads after restoration of mains power following a mains power outage.

22. The method of claim 13 further including the step of assigning at least one load to a plurality of sectors.

23. A method for controlling the energy utilization condition of each of a multiplicity of electric loads within a building, comprising the steps of:
  (a) coupling a central control facility comprising digial data storage means and a central processing unit to a plurality of remotely located load control processors;
  (b) coupling each of said load control processors to control the electrical utilization condition of at least one of the electric loads to a desired one of a plurality of energy utilization conditions;
  (c) assigning each load control processor a unique processor address and storing such processor addresses in said data storage means;
  (d) assigning an energy utilization condition to the multiplicity of loads to define a pattern of such conditions for implementation during any selected time and assembling pattern data to be transmitted to said processors to implement said pattern,
  (e) storing data in said memory means for a plurality of patterns and of pattern identifications;
  (f) sending data from said central control facility to said uniquely addressed load control processors to control the energy utilization condition of each of said loads as defined by one pattern to be implemented;
  (g) selecting a plurality of loads and of load control procesors associated therewith to define a sector and assigning a sector identification to said sector, each sector comprising a different combination of preselected loads and having a different identification;
  (h) storing data in said memory means defining the load control processors controlling the energy utilization condition of the loads of each sector and defining an identification for each sector;
  (i) sending pattern data of one different one of said plurality of patterns from said central control facility to load control processors of a selected one of the sectors, in response to receipt of sector and pattern identification signals, to control the energy utilization condition of loads within the selected sector, whereby the energy utilization condition of loads within the selected sector may be overridden.

24. The method of claim 23 in which the majority of controlled sectors are remote from the central facility.

25. The method of claim 23 in which the loads are lighting loads.

26. The method of claim 25 wherein the means provided for communicating is a telephone line capable of being accessed from remote locations.

27. The method of claim 23 further comprising the step of providing means located adjacent remote sectors for communicating with said central facility to send sector and pattern identification data thereto.

28. The method of claim 23 wherein at least one load is assignable to each of a plurality of different sectors.

29. The method of claim 23 further including the step of extinguishing a sector override at a prescribed real time.

30. The method of claim 23 further including the step of extinguishing an installed sector override when a subsequent pattern is installed.

31. In a system for programmably controlling the energy utilization condition of a multiplicity of electrical loads dispersed within a building of the type wherein a plurality of load control processors, each having a unique address, are each associated with at least one of said loads and are adapted to enable the associated loads individually to a desired one of a plurality of energy utilization conditions, and wherein a central facility is adapted to transmit said unique address and condition data for causing the addressed load control processors to implement the desired energy utilization condition of said loads,
  an arrangement for permitting remote control of sectors, each sector comprising a different preselected group of electrical loads, from remote locations within the vicinity of the sectors to be controlled, comprising,
  (a) means for storing within said central facility, data defining the plurality of loads constituting each of a plurality of sectors,
  (b) means for storing data at said central facility defining energy utilization conditions for each load in each sector as energy utilization patterns,
  (c) signalling means coupled to said central facility and located in the vicinity of the sectors to be controlled, said signalling means being adapted in response to user actuation to transmit to said central facility sector and pattern signals identifying a sector and the pattern to be installed therein,
  (d) means responsive to said sector signal to transmit data from said central facility to said load control processors to cause each of the defined plurality of loads constituting the selected sector to be enabled to the defined energy utilization condition of the selected patterns, to override a previously installed pattern.

32. The system of claim 31 in which the majority of controlled sectors are remote from the central facility.

33. The system of claim 31 in which the loads are lighting loads.

34. The system of claim 31 wherein said signalling means is by a telephone line.

35. The system of claim 31 wherein means are provided for assigning at least one load to each of a plurality of different sectors.

36. The system of claim 31 wherein means are provided for extinguishing an installed sector override at a prescribed real time.

37. The method of controlling the lighting of a plurality of user areas dispersed in a building to any of several preselected lighting patterns, comprising,
  identifying the lighting loads lighting an area as a selected sector, and as representative of any of a plurality of sectors for the plurality of areas,
  providing at least one load control processor for said selected sector, said at least one processor being associated with at least one of the loads of said sector, and said at least one processor being adapted to enable the associated loads of said sector individually to a desired one of a plurality of energy utilization conditions in response to receipt of address and function data,
  assigning a unique address to each load control processor associated with a sector and compiling the processor addresses of each processor associated with each sector as sector data for each sector, establishing sector identification data for each sector, establishing a plurality of lighting patterns for said selected sector by establishing function data defining desired lighting energy utilization conditions for each lighting load of said selected sector, establishing pattern identification data for each pattern, providing a central facility including memory means for storing sector data defining and identifying each of a plurality of patterns for sectors, storing data for each sector in said facility, providing central processing unit (CPU) means at said central facility and providing communication means for said CPU to communicate with said memory means and with said load control processors, providing means for a user to communicate with said central processing unit from the vicinity of said selected sector to furnish sector and pattern identification data to said CPU, programming said CPU to take from said memory means sector data and pattern data of said identified sector and pattern, providing means for assembling said data and transmitting it to the load control processors to enable installation of the selected pattern in the selected sector as a sector override.

38. The method of claim 37 in which the majority of sectors are located remotely from the central facility.

39. The method of claim 37 wherein the communicating means provided is a telephone line capable of being accessed from remote locations.

40. The method of claim 37 wherein at least one load is assignable to each of a plurality of different sectors.

41. The method of claim 37 further comprising the step of installing a sector override at a prescribed real time.

42. The method of claim 37 further comprising the step of extinguishing sector override at a prescribed real time.

43. The method of claim 37 further comprising the step of extinguishing an installed sector override when a subsequent sector override is installed.

* * * * *